US009571862B2

(12) United States Patent
Gao et al.

(10) Patent No.: US 9,571,862 B2
(45) Date of Patent: Feb. 14, 2017

(54) FRAME TYPE DETECTION AND FRAME SIZE DETECTION METHODS AND APPARATUSES FOR VIDEO STREAM

(71) Applicant: HUAWEI TECHNOLOGIES CO., LTD., Shenzhen, Guangdong (CN)

(72) Inventors: Shan Gao, Shenzhen (CN); Lei Zhang, Beijing (CN); Lina Sun, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 409 days.

(21) Appl. No.: 14/469,953

(22) Filed: Aug. 27, 2014

(65) Prior Publication Data

US 2015/0003530 A1  Jan. 1, 2015

Related U.S. Application Data

(63) Continuation of application No. PCT/CN2013/081781, filed on Aug. 19, 2013.

(30) Foreign Application Priority Data

Aug. 21, 2012 (CN) .......................... 2012 1 0298928

(51) Int. Cl.
H04N 7/12 (2006.01)
H04N 19/89 (2014.01)
(Continued)

(52) U.S. Cl.
CPC ............ *H04N 19/89* (2014.11); *H04N 17/004* (2013.01); *H04N 19/103* (2014.11);
(Continued)

(58) Field of Classification Search
CPC .... H04N 19/89; H04N 19/115; H04N 19/103; H04N 19/61; H04N 19/85; H04N 21/6437; H04N 21/44008; H04N 17/004; H04L 43/0835
(Continued)

(56) References Cited

U.S. PATENT DOCUMENTS

2007/0198931 A1  8/2007  Ono et al.
2009/0041114 A1  2/2009  Clark
(Continued)

FOREIGN PATENT DOCUMENTS

CN  101426137 A  5/2009
CN  101558657 A  10/2009
(Continued)

OTHER PUBLICATIONS

Hoffman D et al:"PTR payload format for MPEG1/MPEG2 video", network working group, request for comments: 2038, Oct. 1996, total 11 pages.
(Continued)

Primary Examiner — Allen Wong
(74) Attorney, Agent, or Firm — Huawei Technologies Co., Ltd.

(57) ABSTRACT

Embodiments of the present invention provide frame type detection and frame size detection methods and apparatuses for a video stream. The video frame type detection method includes: obtaining a size of a current video frame; obtaining a change feature value of the current video frame; obtaining an I-frame threshold of the current video frame; and determining whether the previous first video frame is an I frame according to the change feature value of the current video frame and a change feature value of the previous first video frame, the I-frame threshold of the current video frame, and the size of the current video frame, the size of the previous
(Continued)

first video frame, and a size of a previous second video frame. The present invention provides a complete and effective frame type detection method; in addition, impact of a video frame rate is fully considered.

36 Claims, 8 Drawing Sheets

(51) Int. Cl.

| | | |
|---|---|---|
| *H04N 17/00* | (2006.01) | |
| *H04N 19/115* | (2014.01) | |
| *H04N 19/61* | (2014.01) | |
| *H04N 19/103* | (2014.01) | |
| *H04N 19/85* | (2014.01) | |
| *H04N 21/44* | (2011.01) | |
| *H04N 21/6437* | (2011.01) | |
| *H04L 12/26* | (2006.01) | |

(52) U.S. Cl.
CPC ............ *H04N 19/115* (2014.11); *H04N 19/61* (2014.11); *H04N 19/85* (2014.11); *H04N 21/44008* (2013.01); *H04N 21/6437* (2013.01); *H04L 43/0835* (2013.01)

(58) Field of Classification Search
USPC .................................................... 375/240.15
See application file for complete search history.

(56) References Cited

U.S. PATENT DOCUMENTS

| | | |
|---|---|---|
| 2009/0046595 A1 | 2/2009 | Clark |
| 2010/0013757 A1 | 1/2010 | Ogikubo |
| 2010/0054333 A1* | 3/2010 | Bing ................ H04N 21/2385 375/240.12 |
| 2010/0166388 A1 | 7/2010 | Ushiki |
| 2015/0215649 A1 | 7/2015 | Gustafsson et al. |

FOREIGN PATENT DOCUMENTS

| | | |
|---|---|---|
| EP | 2637410 A1 | 9/2013 |
| JP | 2007221497 A | 8/2007 |
| JP | 2012507892 A | 3/2012 |
| KR | 20080101644 A | 11/2008 |
| WO | 2009012302 A1 | 1/2009 |
| WO | 2009025357 A1 | 2/2009 |
| WO | 2012013655 A1 | 2/2012 |
| WO | 2012079406 A1 | 6/2012 |

OTHER PUBLICATIONS

ITU-T P.1201.1; Telecommunication Standardization Sector of ITU; Series P: Terminals and Subjective and Objective Assessment Methods; Models and tools for quality assessment of streamed media; Parametric non-intrusive assessment of audiovisual media streaming quality—lower resolution application area; Oct. 2012; total 52 pages.

* cited by examiner

FRAME TYPE DETECTION AND FRAME SIZE DETECTION METHODS AND APPARATUSES FOR VIDEO STREAM

CROSS-REFERENCE TO RELATED APPLICATIONS

This application is a continuation of International Application No. PCT/CN2013/081781, filed on Aug. 19, 2013, which claims priority to Chinese Patent Application No. 201210298928.3, filed on Aug. 21, 2012, both of which are hereby incorporated by reference in their entireties.

TECHNICAL FIELD

Embodiments of the present invention relate to multimedia technologies, and in particular to frame type detection and frame size detection methods and apparatuses for a video stream.

BACKGROUND

With the rapid development of network media, services such as video on demand, web TV, and video telephone have already become major services of broadband networks and wireless networks, which require an operator to monitor the quality of service of transmitted videos and take timely corresponding measures to perform adjustment to ensure experience demands on media services of a user. Network video quality assessment is an essential technology in network video applications.

According to how much an original reference video is needed, an objective video quality assessment method usually may be classified into three types: full reference, partial reference, and zero reference objective video quality assessments. Due to the limit of channel bandwidth, a video receiving end is usually not able to obtain a desired original reference video sequence, and therefore it is necessary to use the zero reference video quality assessment method to assess a video stream transmitted in a network.

In an existing zero reference video quality assessment method based on a frame type parameter, a type of a video frame needs to be detected first. However, a complete and effective frame type detection method is not available in the prior art.

Furthermore, an existing frame size detection method is only applicable to a frame without no packet loss, and an effective solution of detecting a size of a frame with a packet loss is not available.

SUMMARY

Embodiments of the present invention provide a frame type detection method and apparatus for a video stream, so as to provide a complete and effective frame type detection method.

A first aspect of the present invention provides a frame type detection method for a video stream, including:

obtaining a size of a current video frame, where the current video frame is located after a first video frame of the video stream;

obtaining a change feature value of the current video frame according to the size of the current video frame and a size of a previous first video frame adjacent to the current video frame;

obtaining an I-frame threshold of the current video frame according to a video frame rate and a location of the current video frame; and determining whether the previous first video frame is an I-frame according to the change feature value of the current video frame, a change feature value of the previous first video frame, the I-frame threshold of the current video frame, the size of the current video frame, the size of the previous first video frame, and a size of a previous second video frame adjacent to the previous first video frame.

A second aspect of the present invention provides a frame type detection apparatus for a video stream, including:

a frame size obtaining module, configured to obtain a size of a current video frame, where the current video frame is located after the first video frame of the video stream;

a feature extracting module, configured to obtain a change feature value of the current video frame according to the size of the current video frame and a size of a previous first video frame adjacent to the current video frame;

a threshold obtaining module, configured to obtain an I-frame threshold of the current video frame according to a video frame rate and a location of the current video frame; and a type determining module, configured to determine whether the previous first video frame is an I frame according to the change feature value of the current video frame, a change feature value of the previous first video frame, the I-frame threshold of the current video frame, the size of the current video frame, the size of the previous first video frame, and a size of a previous second video frame adjacent to the previous first video frame.

A third aspect of the present invention provides a frame type detection method for a video stream, including:

obtaining a size of a current video frame, where the current video frame is located after the first video frame of the video stream;

obtaining a change feature value of the current video frame according to the size of the current video frame and sizes of at least two previous video frames;

obtaining an I-frame threshold of the current video frame according to a video frame rate and a location of the current video frame; and determining, according to the change feature value of the current video frame, a change feature value of a previous first video frame adjacent to the current video frame, the I-frame threshold of the current video frame, the size of the current video frame, and the sizes of the at least two previous video frames, whether the previous first video frame is an I frame.

A fourth aspect of the present invention provides a frame type detection apparatus for a video stream, includings:

a frame size obtaining module, configured to obtain a size of a current video frame, where the current video frame is located after the first video frame of the video stream;

a feature extracting module, configured to obtain a change feature value of the current video frame according to the size of the current video frame and sizes of at least two previous video frames;

a threshold obtaining module, configured to obtain an I-frame threshold of the current video frame according to a video frame rate and a location of the current video frame; and a type determining module, configured to determine, according to the change feature value of the current video frame, a change feature value of a previous first video frame adjacent to the current video frame, the I-frame threshold of the current video frame, the size of the current video frame, and the sizes of the at least two previous video frames, whether the previous first video frame is an I frame.

One of the several technical solutions in the foregoing has at least the following beneficial effects or advantages:

In the embodiments of the present invention, a change feature value of a current video frame is obtained according to sizes of the current video frame and a previous first video frame adjacent to the current video frame, an I-frame threshold of the current video frame is obtained according to a video frame rate and a location of the current video frame, and it is determined whether the previous first video frame is an I frame according to the change feature value of the current video frame and a change feature value of the previous first video frame, the I-frame threshold of the current video frame, and the size of the current video frame, the size of the previous first video frame, and a size of a previous second video frame. This provides a complete and effective frame type detection method, and only one video frame before the previous first video frame is considered, that is, the previous second video frame, during detection of a frame type of the previous first video frame. This solves problems of high complexity and long delay due to calculation based on a plurality of previous video frames in existing video frame type detection, and impact of a video frame rate is fully considered, making a result of the detection more accurate.

Embodiments of the present invention further provide a frame size detection method, so as to provide an effective solution of detecting a size of a frame with a packet loss.

A fifth aspect of the present invention provides a frame size detection method, including:

if it is determined that a packet loss occurs between two received RTP packets, obtaining a payload of each received RTP packet, and estimating a payload of each lost RTP packet according to the payload of each received RTP packet;

obtaining the total number V_lostPackets of lost RTP packets between the two RTP packets according to the sequence numbers of the two RTP packets;

estimating the number of lost RTP packets in each frame with a packet loss according to the total number V_lostPackets of lost RTP packets, and timestamps and marker bits of the two RTP packets; and obtaining a size of each frame with the packet loss according to the number of lost RTP packets in each frame with the packet loss and a payload of each lost RTP packet.

A sixth aspect of the present invention provides a frame size detection apparatus, including:

a payload estimating module, configured to: if it is determined that a packet loss occurs between two received RTP packets, obtain a payload of each received RTP packet, estimate a payload of each lost RTP packet according to the payload of each received RTP packet;

a total loss number obtaining module, configured to obtain the total number V_lostPackets of lost RTP packets between the two RTP packets according to the sequence numbers of the two RTP packets;

an each loss number estimating module, configured to estimate the number of lost RTP packets in each frame with a packet loss according to the total number of lost RTP packets V_lostPackets, and timestamps and marker bits of the two RTP packets; and a frame size detecting module, configured to obtain a size of each frame with the packet loss according to the number of lost RTP packets in each frame with the packet loss and a payload of each lost RTP packet.

One of the several technical solutions in the foregoing has at least the following beneficial effects or advantages:

In the embodiments of the present invention, if it is determined that a packet loss occurs between two received RTP packets, a payload of each lost RTP packet is estimated according to a payload of each received RTP packet, the total number of lost RTP packets between the two RTP packets is obtained according to sequence numbers of the two RTP packets, and then the number of lost RTP packets in each frame with a packet loss is estimated according to the total number V_lostPackets of lost RTP packets, and timestamps and marker bits of the two RTP packets, so that a size of each frame with the packet loss is obtained according to the number of lost RTP packets in each frame with the packet loss and the payload of each lost RTP packet. This provides an effective solution of detecting a size of a frame with a packet loss.

BRIEF DESCRIPTION OF DRAWINGS

To describe the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are merely a part rather than all of the embodiments of the present invention.

Figure 1:
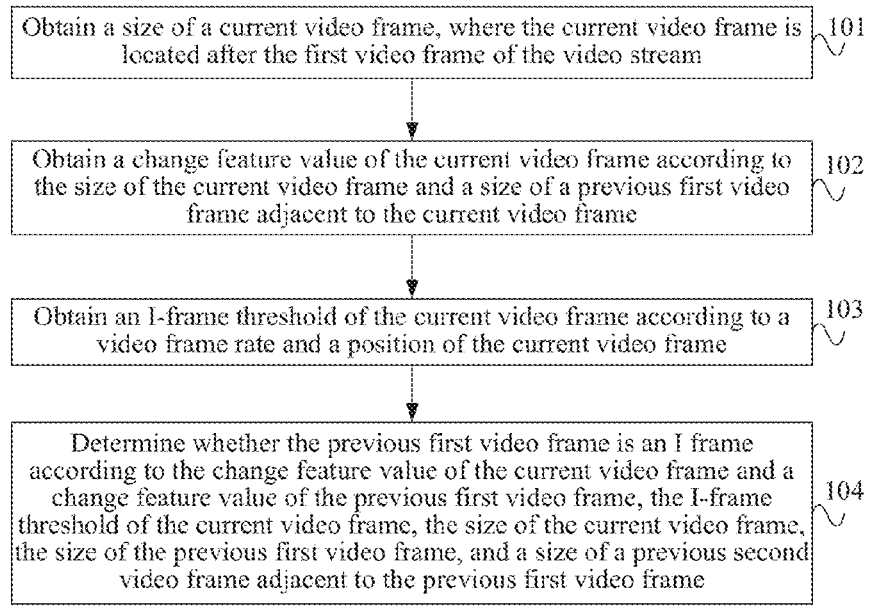
FIG. 1 is a schematic flow chart of a frame type detection method for a video stream according to an embodiment of the present invention.

FIG. 1 is a schematic flow chart of a frame type detection method for a video stream provided by an embodiment of the present invention. As shown in FIG. 1, the method includes:

101. Obtain a size of a current video frame, where the current video frame is located after the first video frame of the video stream.

For example, a frame type detection apparatus for a video stream provided by this embodiment of the present invention determines a size of a current video frame. The video frame type detection apparatus may be disposed in a network device or test device. Specifically, the video frame type detection apparatus receives a video stream. The video stream may be transmitted by using the User Datagram Protocol (User Datagram Protocol, UDP for short) or the Transport Control Protocol (Transport Control Protocol, TCP for short) protocol, or may be further transmitted by using other transfer protocols such as the Real-time Transport Protocol (Real-time Transport Protocol, RTP for short), the Transport Stream (Transport Stream, TS for short), and the Hypertext Transfer Protocol (Hypertext Transfer Protocol, HTTP for short). The following description uses an example in which a video stream is transmitted by using the RTP transport protocol. When a video stream is transmitted by using the RTP, each video frame in the video stream includes at least one RTP packet. FIG. 1 is a schematic diagram of a format of an RTP packet. As shown in FIG. 1, the RTP packet is formed by an RTP packet header and an RTP payload. The RTP packet header layer includes, for example, a marker (marker) bit, a timestamp, a sequence number, and the like.

RTP packets in consecutive video frames have incremental sequence numbers, a value of a sequence number ranges from 0 to 65535 (including 65535), and the increment continues from 0 again every time when the sequence number exceeds 65535. Therefore, whether a packet loss occurs and the number of lost RTP packets may be determined by using sequence numbers of received RTP packets. For sequence numbers of two consecutively received RTP packets, if the sequence number of the latter is greater than that of the former, the total number V_lostPackets of lost RTP packets between the two consecutively received RTP packets may be calculated by using Formula (1):

$$V\_lostPackets = \text{the sequence number of the latter} - \text{the sequence number of the former} - 1 \quad (1)$$

If the sequence number of the latter is greater than that of the former by 1, V_lostPackets=0, and a packet loss does not occur.

For the sequence numbers of the two consecutively received RTP packets, if the sequence number of the latter is not greater than that of the former, the total number V_lostPackets of lost RTP packets between the two consecutively received RTP packets may be calculated by using Formula (2):

$$V\_lostPackets = \text{the sequence number of the latter} + 65536 - \text{the sequence number of the former} - 1 \quad (2)$$

If the sequence number of the latter is smaller than that of the former by 65535, and timestamps are the same, V_lostPackets=0, and a packet loss does not occur.

Furthermore, in consecutively received RTP packets, the received RTP packets are classified into different video frames by using a marker bit and/or a timestamp of an RTP packet header. In a same video frame, a marker bit of the last RTP packet header of the video frame is 1, and marker bits of the other RTP packets are 0. In addition, all the RTP packet headers of the video frame have the same timestamp, which is different from the timestamp of an adjacent video frame. Furthermore, when it is determined that a packet loss occurs between the consecutively received RTP packets, it may be further determined according to the timestamps in the RTP packet headers whether a video frame loss occurs between the consecutively received RTP packets, that is, all RTP packets in one video frame are lost, and the number V_lostFrames of lost video frames may be calculated by using the following Formula (3):

$$V\_lostFrames = \frac{(V\_TS_t - V\_TS_{t-1}) \cdot videoFrameRate}{V\_CR} - 1 \quad (3)$$

where $V\_TS_t$ is a timestamp of the latter RTP packet in the two consecutively received RTP packets, $V\_TS_{t-1}$ is a timestamp of the former RTP, videoFrameRate is a video frame rate of a current video stream, and V_CR is a clock rate (Clock Rate) of an RTP packet.

If the video stream is H.264, a value of V_CR must be 90000. If the video stream is MPEG4, a recommended value of V_CR is 90000. Furthermore, the value may also be obtained by using the following two methods:

(1) If there is the Session Description Protocol (Session Description Protocol, SDP for short), the value may be obtained from the SDP.

(2) If there is no SDP, and videoFrameRate is known, the value is obtained by using Formula (4):

$$V\_CR = videoFrameRate \cdot V\_TSm \quad (4)$$

Furthermore, videoFrameRate is known information or is read from a preset location. The preset location includes a preset file or a preset storage location. videoFrameRate may also be calculated by using a difference value between timestamps of RTP packet headers of two consecutively received video frames. A case in which one entire video frame is lost must not occur between the two consecutively received video frames, that is, videoFrameRate is obtained by using Formula (5):

$$videoFrameRate = \frac{V\_CR}{V\_TSm} \quad (5)$$

where V_TSm is the difference value between the timestamps of RTP packet headers of the two consecutive video frames.

Based on the foregoing method of determining whether an RTP packet is lost and whether a video frame is lost, it may be determined whether a packet loss occurs in a current video frame and whether the entire current video frame is lost.

If it is determined that the packet loss does not occur in the current video frame, that is, all RTP packets in the current video frame are received, a payload of each RTP packet in the received current video frame is determined. The payload of each RTP packet in the current video frame is accumulated to obtain a size of the current video frame.

Specifically, as shown in FIG. 1, a payload of an RTP packet=a size of the RTP packet−a size of an RTP packet header layer, where the size of the RTP packet may be obtained from information about an upper layer protocol for encapsulating the RTP packet, and the size of the RTP packet header layer may be determined by receiving the RTP packet and then parsing the packet header layer.

If it is determined that the packet loss occurs in the current video frame and the entire frame is not lost, the payload of each received RTP packet in the current video frame is obtained, and the payload of each received RTP packet in the current video frame is accumulated to obtain a total size of the received RTP packets in the current video frame.

According to a previous adjacent RTP packet and a next adjacent RTP packet, among all received RTP packets, of a lost RTP packet in the current video frame, a payload of each lost RTP packet and the number of lost RTP packets in the current video frame are estimated, and a total size of the lost RTP packets in the current video frame is obtained according to the payload of each lost RTP packet and the number of lost RTP packets in the current video frame.

The total size of the received RTP packets and the total size of the lost RTP packets in the current video frame are added to obtain the size of the current video frame.

Each lost RTP packet may be a lost RTP packet between the received previous adjacent RTP packet and next adjacent RTP packet.

Specifically, the payload V_lostBytes of each lost RTP packet may be estimated according to an average value of a payload of the previous adjacent RTP packet and a payload of the next adjacent RTP packet by referring to Formula (6):

$$V\_lostBytes = \frac{V\_receivedBytes_t + V\_receivedBytes_{t-1} + 1}{2} \quad (6)$$

where $V\_receivedBytes_t$ is the payload of the next adjacent RTP packet of the lost RTP packet in the received RTP packets, and $V\_receivedBytes_{t-1}$ is the payload of the previous adjacent RTP packet of the lost RTP packet in the received RTP packets. If consecutive packets are lost, that is, the number of consecutively lost RTP packets is greater than 1, it is estimated that the payload V_lostBytes of each lost RTP packet is equal. For example, if RTP packets whose sequence numbers are respectively 3 and 5 are consecutively received, it is determined that an RTP packet whose sequence number is 4 is lost, and it is estimated according to the foregoing formula that a payload of the RTP packet whose sequence number is 4 is an average value of payloads of the RTP packets whose sequence numbers are respectively 3 and 5. For another example, if RTP packets whose sequence numbers are respectively 3 and 7 are consecutively received, it is determined that RTP packets whose sequence numbers are respectively 4, 5, and 6 are lost, and it is estimated according to the foregoing formula that a payload of each of the RTP packets whose sequence numbers are 4, 5, 6 is an average value of payloads of the RTP packets whose sequence numbers are 3 and 7.

In addition, the payload of each lost RTP packet may further be estimated according to an average value of payloads of a plurality of RTP packets received before the lost RTP packet, for example, an average value of payloads of all RTP packets received before the lost RTP packet, or an average value of payloads of RTP packets received inside a sliding window before the lost RTP packet.

Furthermore, there are the following five cases in which a packet loss occurs in a current video frame but an entire frame is not lost.

First case: It is determined according to sequence numbers of two consecutively received RTP packets that a packet loss occurs between the two RTP packets and it is determined according to timestamps of the two RTP packets that both the RTP packets belong to a current video frame, that is, it is determined according to timestamps of the former adjacent RTP packet and the latter adjacent RTP packet that the former adjacent RTP packet and the latter adjacent RTP packet both belong to the current video frame. In this case, all lost RTP packets between the two RTP packets are allocated to the current video frame. Specifically, according to Formula (1) or (2), the total number V_lostPackets of lost RTP packets between the two RTP packets is determined, and it is determined that the number of lost RTP packets in the current video frame equals V_lostPackets.

Figure 2A:
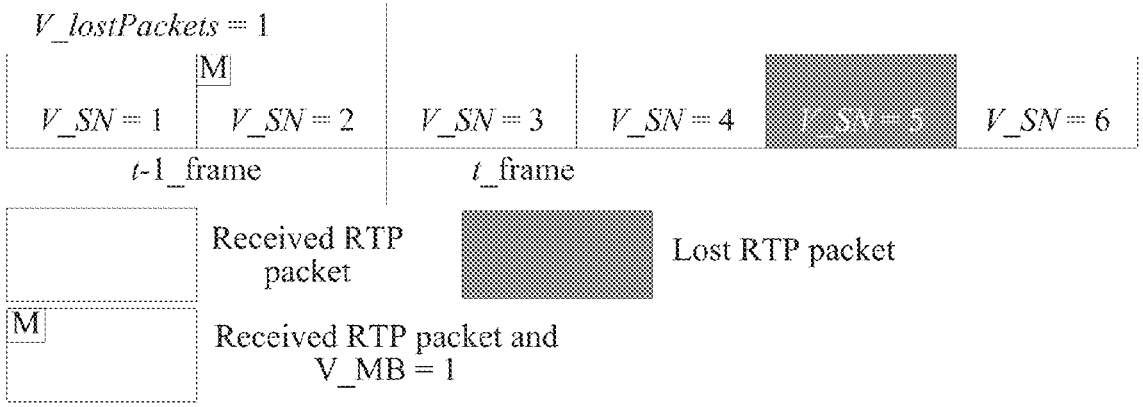
FIG. 2A to 2I are schematic diagrams of Examples 1 to 9 of packet loss according to an embodiment of the present invention.

An example of the first case, that is, Packet Loss Example 1, is provided in the following. FIG. 2A is a schematic diagram of Packet Loss Example 1 according to an embodiment of the present invention. As shown in FIG. 2A, an RTP packet whose sequence number (V_SN) is 5 is lost, RTP packets whose sequence numbers are 4 and 6 are consecutively received RTP packets, and the total number of lost RTP packets is 1. The number of lost RTP packets (V_lostP_t_frame) allocated to the current video frame (t_frame) is 1.

Second case: It is determined according to sequence numbers of two consecutively received RTP packets that a packet loss occurs between the two RTP packets, it is determined according to timestamps of the two RTP packets that the former RTP packet belongs to a previous first video frame of a current video frame and the latter RTP packet belongs to the current video frame, and it is determined according to a marker bit of the former RTP packet that the former RTP packet is the last RTP packet in the previous first video frame, that is, it is determined according to timestamps and marker bits of the former adjacent RTP packet and the latter adjacent RTP packet that the former adjacent RTP packet belongs to the previous first video frame and latter adjacent RTP packet belongs to the current video frame, and the former adjacent RTP packet is the last RTP packet in the previous first video frame. In this case, all lost RTP packets between the two RTP packets are allocated to the current video frame. Specifically, according to Formula (1) or (2), the total number V_lostPackets of lost RTP packets between the two RTP packets is obtained, and it is determined that the number of lost RTP packets in the current video frame equals V_lostPackets.

Figure 2B:
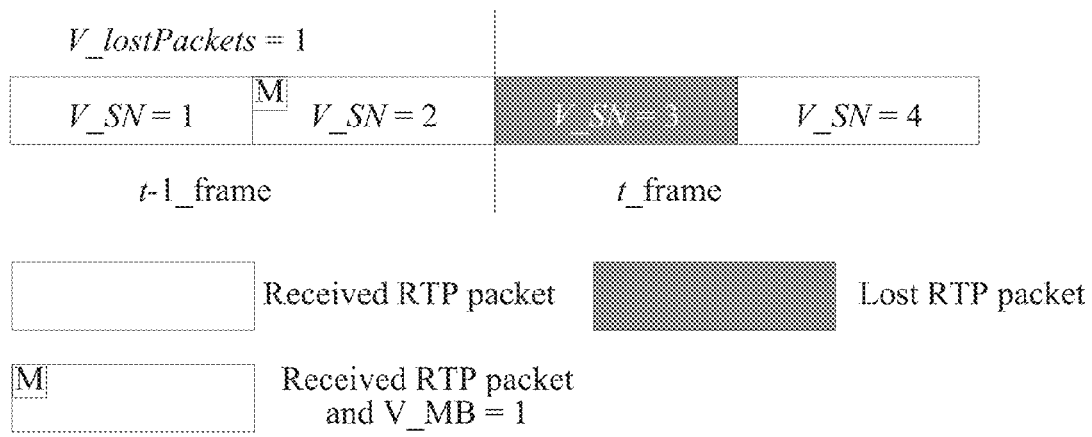

An example of the second case, that is, Packet Loss Example 2, is provided in the following. FIG. 2B is a schematic diagram of Packet Loss Example 2 according to an embodiment of the present invention. As shown in FIG. 2B, an RTP packet whose sequence number (V_SN) is 3 is lost, RTP packets whose sequence numbers are 2 and 4 are consecutively received RTP packets, an RTP packet whose sequence number is 2 is the last received RTP packet in the previous first video frame (t−1_frame) and a marker bit (V_MB) is 1, the RTP packet whose sequence number is 4 is the first received RTP packet in the current video frame (t_frame), and the total number of lost RTP packets is 1. The number of lost RTP packets (V_lostPt_frame) allocated to the current video frame is 1.

Third case: It is determined according to sequence numbers of two consecutively received RTP packets that a packet loss occurs between the two RTP packets, it is determined according to timestamps of the two RTP packets that the former RTP packet belongs to a current video frame and the latter RTP packet belongs to a next adjacent video frame of the current video frame, and it is determined according to a marker bit of the former RTP packet that the former RTP packet is not the last RTP packet in the current video frame, that is, it is determined according to timestamps and marker bits of the former adjacent RTP packet and the latter adjacent RTP packet that the former adjacent RTP packet belongs to the current video frame and the latter adjacent RTP packet belongs to the next adjacent video frame of the current video frame and the former adjacent RTP packet is not the last RTP packet in the current video frame. In this case, the total number V_lostPackets of lost RTP packets between the two consecutively received RTP packets is first obtained according to Formula (1) or (2), the V_lostPackets RTP packets are evenly allocated to the current video frame and a next video frame, and then the rest lost RTP packets after the even allocation are allocated to the current video frame, that is, the number of lost RTP packets in the current video frame is int(V_lostPackets/2)+V_lostPackets%2, where int represents rounding, % represents a modulus operation, that is, %2 represents the remainder of division by 2.

Figure 2C:
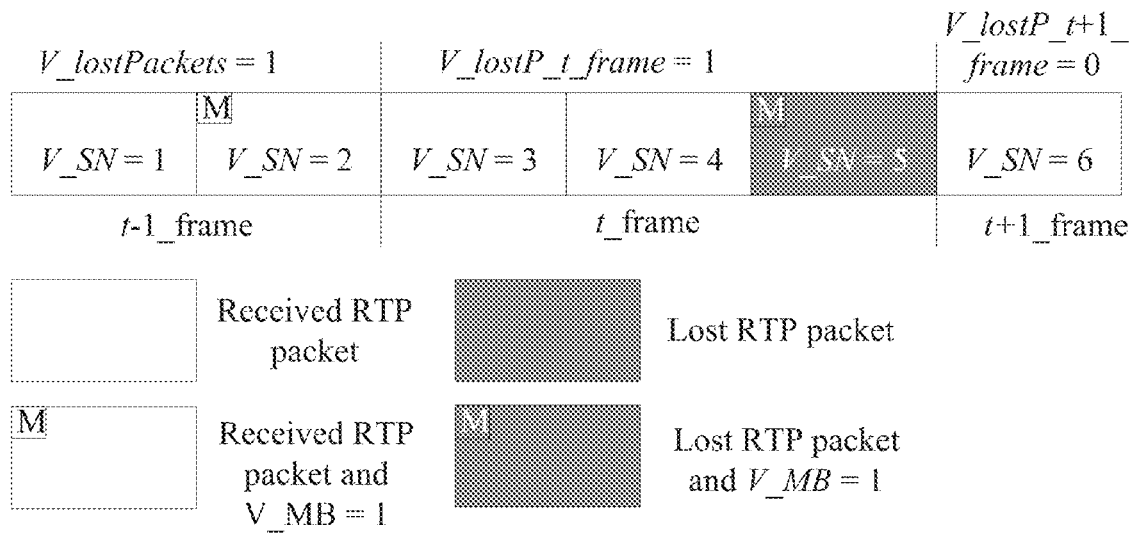
Figure 2D:
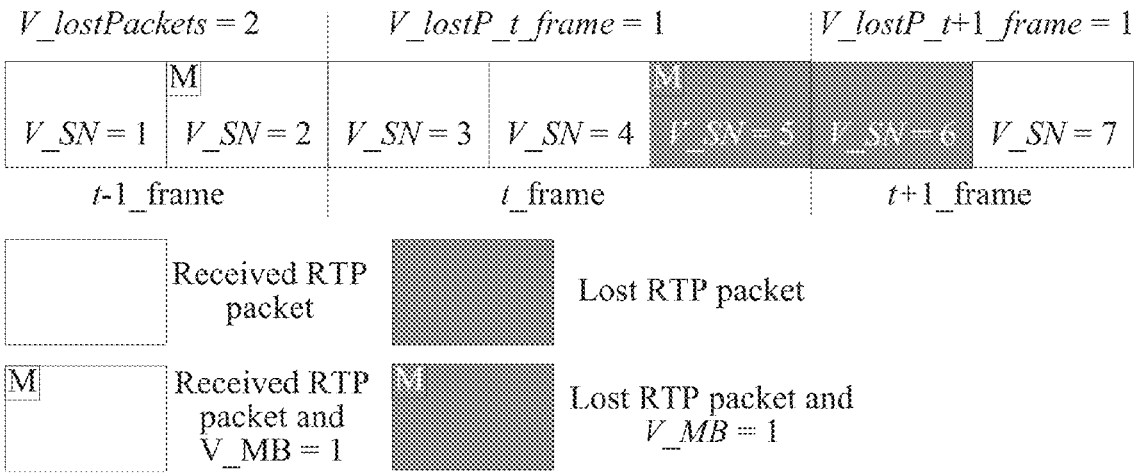
Figure 2E:
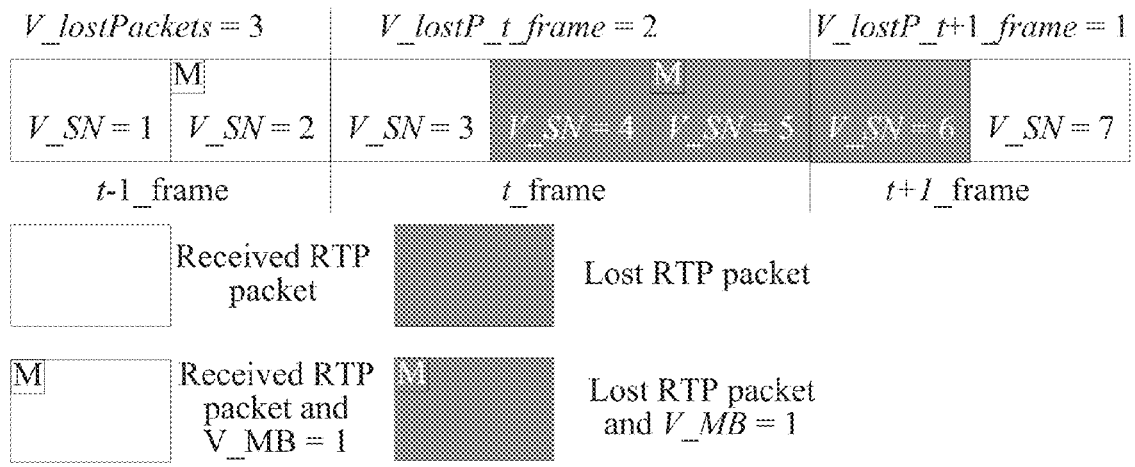

Three examples of the third case, that is, Packet Loss Examples 3, 4, and 5, are provided in the following. FIG. 2C to FIG. 2E are respectively schematic diagrams of Packet Loss Examples 3, 4, and 5 according to embodiments of the present invention.

As shown in FIG. 2C, in Packet Loss Example 3, an RTP packet whose sequence number is 5 is lost, RTP packets whose sequence numbers are 4 and 6 are consecutively received RTP packets, the RTP packet whose sequence number is 4 is the last received RTP packet in a current video frame (t_frame) and a marker bit (V_MB) is not 1, and the RTP packet whose sequence number is 6 is the first received RTP packet in a next adjacent video frame (t+1_frame) of the current video frame, the total number of lost RTP packets V_lostPackets is 1. Therefore, the number of lost RTP packets allocated to the current video frame (V_lost_t_frame) is int(1/2)+1%2=1, and the number of lost RTP packets allocated to the next video frame (V_lostP_t+1_frame) is int(1/2)=0.

As shown in FIG. 2D, Packet Loss Example 4: RTP packets whose sequence numbers (V_SN) are 5 and 6 are lost, RTP packets whose sequence numbers are 4 and 7 are consecutively received RTP packets, the RTP packet whose sequence number is 4 is the last received RTP packet in a current video frame (t_frame) and a marker bit (V_MB) is not 1, the RTP packet whose sequence number is 7 is the first received RTP packet in a next adjacent video frame (t+1_frame) of the current video frame, and the total number of lost RTP packets V_lostPackets is 2. Therefore, the number (V_lostP_t_frame) of lost RTP packets allocated to the current video frame (t_frame) is int(2/2)+2%2=1, and the number (V_lostP_t+1_frame) of lost RTP packets allocated to the next video frame (t+1_frame) is int(2/2)=1.

As shown in FIG. 2E, Packet Loss Example 5: RTP packets whose sequence numbers (V_SN) are 4, 5, and 6 are lost, RTP packets whose sequence numbers are 3 and 7 are consecutively received RTP packets, the RTP packet whose sequence number is 3 is the last received RTP packet in a current video frame (t_frame) and a marker bit (V_MB) is not 1, the RTP packet whose sequence number is 7 is the first received RTP packet in a next adjacent video frame (t+1_frame) of the current video frame, and the total number V_lostPackets of lost RTP packets is 3. Therefore, the number (V_lostP_t_frame) of lost RTP packets allocated to the current video frame is int(3/2)+3%2=2, and the number (V_lostP_t+1_frame) of lost RTP packets allocated to the next video frame is int(3/2)=1.

Fourth case: It is determined according to sequence numbers of two consecutively received RTP packets that a packet loss occurs between the two RTP packets, it is determined according to timestamps of the two RTP packets that a video frame to which the former RTP packet belongs and a current video frame are nonconsecutive, and the latter RTP packet belongs to the current video frame, and it is determined according to a marker bit of the former RTP packet that the former RTP packet is the last RTP packet in the video frame to which the former RTP packet belongs, that is, it is determined according to timestamps and marker bits of the former adjacent RTP packet and the latter adjacent RTP packet that the video frame to which the former adjacent RTP packet belongs and the current video frame are nonconsecutive, the latter adjacent RTP packet belongs to the current video frame, and the former adjacent RTP packet is the last RTP packet in the video frame to which the former adjacent RTP packet belongs. That is, an entire video frame is lost between the two consecutively received RTP packets. In this case, the total number V_lostPackets of lost RTP packets between the two RTP packets is first obtained according to Formula (1) or (2), the number of lost video frames V_lostFrames is obtained according to Formula (3), the lost RTP packets are then evenly allocated to each lost video frame, and eventually the rest lost RTP packets after the even allocation is allocated to the current video frame, that is, the number of lost RTP packets in the current video frame is V_lostPackets%V_lostFrames.

Figure 2F:
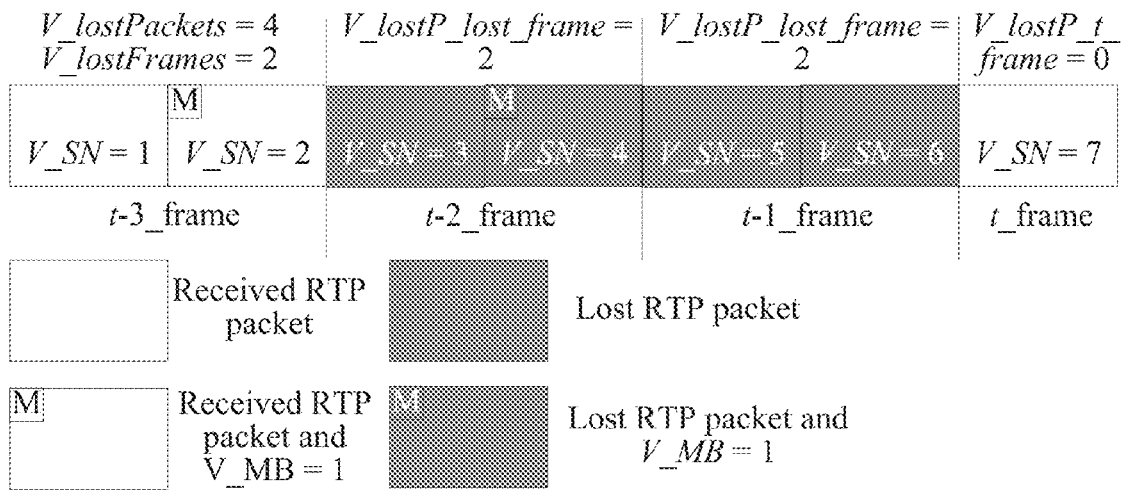
Figure 2G:
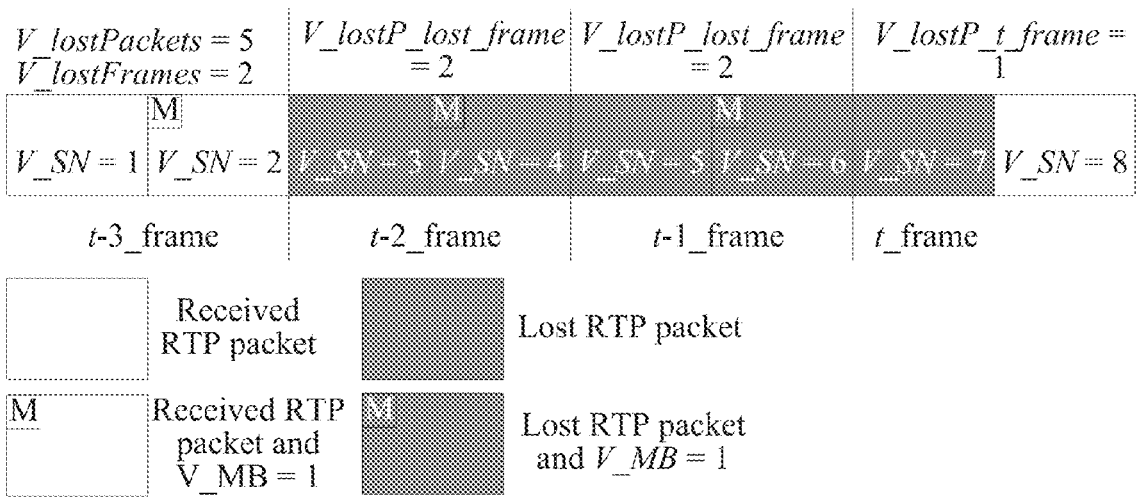

Two examples of the fourth case, that is, Packet Loss Examples 6 and 7, are provided in the following. FIG. 2F and FIG. 2G are respectively schematic diagrams of Packet Loss Examples 6 and 7 according to an embodiment of the present invention.

As shown in FIG. 2F, in Packet Loss Example 6, RTP packets whose sequence numbers (V_SN) are 3, 4, 5, and 6 are lost, RTP packets whose sequence numbers are 2 and 7 are consecutively received RTP packets and have nonconsecutive timestamps, the RTP packet whose sequence number is 2 is the last received RTP packet in a received previous video frame (t−3_frame) and a marker bit (V_MB) is 1, the RTP packet whose sequence number is 7 is the first received RTP packet in a current video frame (t_frame), and the total number V_lostPackets of lost RTP packets is 4. If the number V_lostFrames of lost entire video frames obtained according to Formula (3) is 2, the number(V_lostP_lost_frame) of lost RTP packets allocated to each lost video frame, that is, either a previous second video frame (t−2_frame) or a previous first video frame (t−1_frame), is int(V_lostPackets/V_lostFrames)=int(4/2)=2, and the number (V_lostP_t_frame) of lost RTP packets allocated to the current video frame V_lostPackets%V_lostFrames=4%2=0. It should be noted that because an entire frame is lost before the current video frame, the received previous video frame (t−3_frame) is not the actual previous video frame (t−1_frame).

As shown in FIG. 2G, in Packet Loss Example 7: RTP packets whose sequence numbers (V_SN) are 3, 4, 5, 6, and 7 are lost, RTP packets whose sequence numbers are 2 and 8 are consecutively received RTP packets and have nonconsecutive timestamps, the RTP packet whose sequence number is 2 is the last received RTP packet in a received previous video frame (t−3_frame) and a marker bit (V_MB) is 1, the RTP packet whose sequence number is 8 is the first received RTP packet in a current video frame (t_frame), and the total number V_lostPackets of lost RTP packets is 5. If the number V_lostFrames of lost video frames obtained according to Formula (3) is 2, the number (V_lostP_lost_frame) of lost RTP packets allocated to each lost video frames, that is, either a previous second video frame (t−2_frame) or a previous first video frame (t−1_frame), is int(V_lostPackets/V_lostFrames)=int(5/2)=2, and the number (V_lostP_t_frame) of lost RTP packets allocated to the current video frame is V_lostPackets%V_lostFrames=5%2=1.

Fifth case: It is determined according to the sequence numbers of two consecutively received RTP packets that a packet loss occurs between the two RTP packets, it is determined according to timestamps of the two RTP packets that the former RTP packet belongs to a current video frame, a video frame to which the latter RTP packet belongs and the current video frame are nonconsecutive, and it is determined according to a marker bit of the former RTP packet that the former RTP packet is not the last RTP packet in the current video frame, that is, it is determined according to timestamps and marker bits of the former adjacent RTP packet and latter adjacent RTP packet that the former adjacent RTP packet belongs to the current video frame, the video frame to which the latter adjacent RTP packet belongs and the current video frame are nonconsecutive, and the former adjacent RTP packet is not the last RTP packet in the current video frame. In this case, the numberV_lostFrames of lost video frames is first obtained according to Formula (3), one lost RTP packet is first allocated to the current video frame, and the rest lost RTP packets are evenly allocated to the lost video frames, the rest lost RTP packets after the even allocation are allocated to the video frame to which the latter RTP packet belongs, that is, the received next video frame, which is equivalent to that the number of lost RTP packets in the current video frame is 1.

Figure 2H:
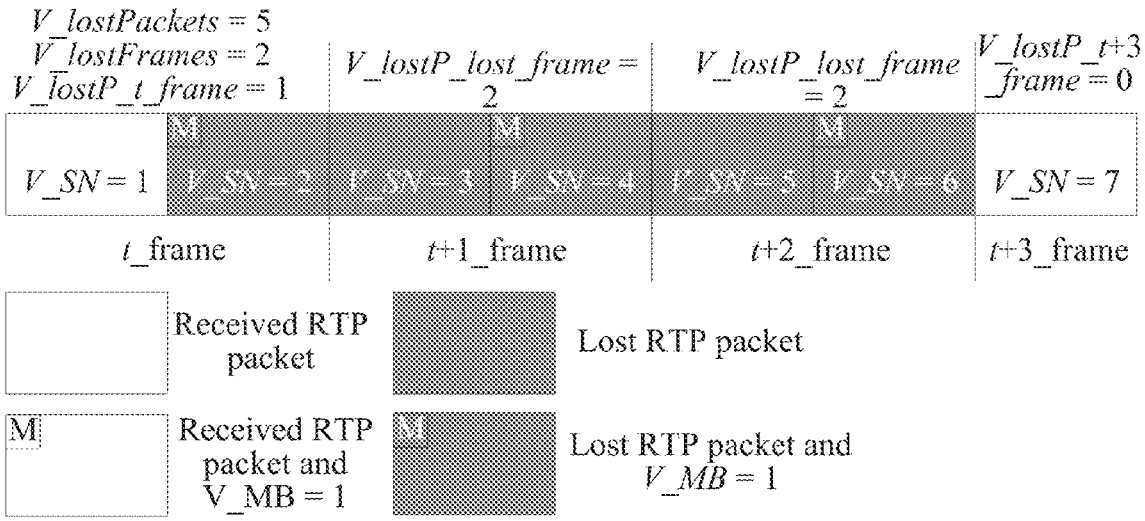
Figure 2I:
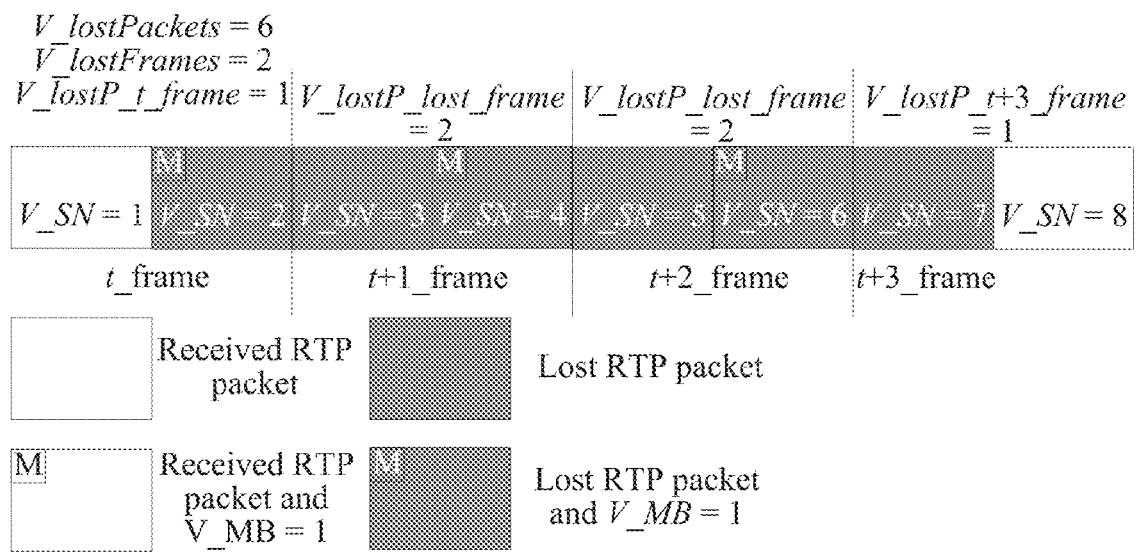

Two examples of the fifth case, that is, Packet Loss Examples 8 and 9, are provided in the following. FIG. 2H and FIG. 2I are respectively schematic diagrams of Packet Loss Examples 8 and 9 according to embodiments of the present invention.

As shown in FIG. 2H, in Packet Loss Example 8, RTP packets whose sequence numbers (V_SN) are 2, 3, 4, 5, and 6 are lost, RTP packets whose sequence numbers are 1 and 7 are consecutively received RTP packets and have nonconsecutive timestamps, the RTP packet whose sequence number is 1 is the last received RTP packet in the current video frame (t_frame) and a marker bit (V_MB) is not 1, the RTP packet whose sequence number is 7 is the first received RTP packet in a received next video frame (t+3_frame), and the total number V_lostPackets of lost RTP packets is 5. If the number V_lostFrames of lost video frames obtained according to Formula (3) is 2, the number (V_lostP_t_frame) of lost RTP packets allocated to the current video frame is 1, the number (V_lostP_lost_frame) of lost RTP packets allocated to each lost video frame, that is, either a next adjacent video frame (t+1_frame) of the current video frame or a second next video frame (t+2_frame) adjacent to the next video frame, is int((V_lostPackets−1)/V_lostFrames)=int(4/2)=2, and the number (V_lostP_t+3_frame) of lost RTP packets allocated to the received next video frame is (V_lostPackets−1)% V_lostFrames=4%2=0. It should be noted that because an entire frame is lost after the current video frame, the received next video frame (t+3_frame) is not the actual next video frame (t+1_frame) adjacent to the current video frame.

As shown in FIG. 2I, in Packet Loss Example, RTP packets whose sequence numbers (V_SN) are 2, 3, 4, 5, 6, and 7 are lost, RTP packets whose sequence numbers are 1 and 8 are consecutively received RTP packets and have nonconsecutive timestamps, the RTP packet whose sequence number is 1 is the last received RTP packet in a current video frame (t_frame) and a marker bit (V_MB) is not 1, the RTP packet whose sequence number is 8 is the first received RTP packet in a received next video frame (t+3_frame), and the total number V_lostPackets of lost RTP packets is 6. If the numberV_lostFrames of lost video frames obtained according to Formula (3) is 2, the number (V_lostP_t_frame) of lost RTP packets allocated to the current video frame is 1, the number (V_lostP_lost_frame) of lost RTP packets allocated to each lost entire video frame, that is, either a next video frame (t+1_frame) adjacent to the current video frame or a second next video frame (t+2_frame) adjacent to the next video frame, is int((V_lostPackets−1)/V_lostFrames)=int(5/2)=2, and the number of lost RTP packets allocated to the received next video frame (V_lostP_t+3_frame) is (V_lostPackets−1)% V_lostFrames=5%2=1.

In addition, referring to the foregoing fourth and fifth cases, if it is determined that the entire current video frame is lost, the payload of each lost RTP packet is estimated according to the previous adjacent RTP packet and the next adjacent RTP packet, in the current video frame, in all the received RTP packets, and the number V_lostFrames of lost entire video frames between the video frame to which the previous adjacent RTP packet belongs and the video frame to which the next adjacent RTP packet belongs and the total number V_lostPackets of lost RTP packets are obtained according to a video frame rate, a clock rate of an RTP packet, and timestamps and sequence numbers of the previous adjacent RTP packet and the next adjacent RTP packet.

If it is determined according to the marker bit of the previous adjacent RTP packet that the previous adjacent RTP packet is the last RTP packet in the video frame to which the previous adjacent RTP packet belongs, it is determined that the number of RTP packets in the current video frame is int(V_lostPackets/V_lostFrames), and otherwise it is determined that the number of RTP packets in the current video frame is int((V_lostPackets−1)/V_lostFrames).

The size of the current video frame is obtained according to the number of RTP packets in the current video frame and the payload of each lost RTP packet.

Furthermore, a size of each video frame except the first video frame may further be obtained with reference to the foregoing method.

102. Obtain a change feature value of the current video frame according to the size of the current video frame and a size of a previous first video frame adjacent to the current video frame.

Specifically, to lower the complexity of calculation, when only one video frame before, that is, a previous first video frame is considered, an absolute value of a difference value between the size of the current video frame and the size of the previous first video frame may be used as the change feature value of the current video frame. In this case, the change feature value is equivalent to a slope, which is represented by the formula as follows:

$$V\_FG_{t\_frame}=(\text{abs})(t\_frame\_size-t-1\_frame\_size) \quad (7)$$

where V_FGt_frame is the change feature value of the current video frame, t_frame_size is the size of the current video frame, t−1_frame_size is the size of the previous first video frame, and abs represents the absolute value.

Furthermore, the change feature value of each video frame except the first video frame, that is, a change feature value of the previous first video frame except the first video frame, may further be obtained with reference to the foregoing method.

103. Obtain an I-frame threshold of the current video frame according to a video frame rate and a location of the current video frame.

Specifically, an I-frame threshold of the current video frame may be obtained according to a video frame rate and a distance between the current video frame and a previous closest I frame in 103. Here, the distance between the current video frame and the previous closest I frame is the number of video frames between the current video frame and the previous closest I frame. In other words, the distance in this embodiment of the present invention is the number of video frames between one video frame and another video frame. For example, if the previous second video frame adjacent to the previous first video frame is a previous closest I frame, the distance between the current video frame and the previous closest I frame is 2. It should be noted that the I frame in this embodiment of the present invention refers to an intra-frame encoding frame.

Furthermore, if the previous second video frame is the previous closest I frame, that is, the distance between the current video frame and the previous closest I frame is 2, it is determined that the I-frame threshold of the current video frame is a product of a size of the previous closest I frame and a first constant, where a value range of the first constant is (0,1], (0,1] represents that the value range is greater than zero and is less than or equal to 1.

The first constant here may be a default fixed value, for example, ⅔, or may also be determined according to a video frame rate and a code rate. Specifically, the size of the current video frame may be used as the code rate, or an average value of the size of the current video frame and a size of at least one previous video frame may also be used as the code rate. Furthermore, a product of an average size of all detected I frames and the first constant may also be used as the I-frame threshold of the current video frame.

If the previous second video frame is not the previous closest I frame, it is determined whether the distance between the current video frame and the previous closest I frame is greater than the video frame rate, if greater than, a product of an I-frame threshold of the previous first video frame and a first scale factor is determined as the I-frame threshold of the current video frame, and if not greater than, the product of the I-frame threshold of the previous first video frame and a second scale factor is determined as the I-frame threshold of the current video frame. A value range of the first scale factor and the second scale factor is (0,1], and the first scale factor is greater than the second scale factor. Correspondingly, the process is represented as follows by using an algorithm:

```
IF (V_FDI ≤ (int)videoFrameRate ) THEN
        V_IThresh_{t_frame} = V_IThresh_{t-1_frame} × ScaledFactor2
ELSE
        V_IThresh_{t_frame} = V_IThresh_{t-1_frame} × ScaledFactor1
``` where V_FDI is the distance between the current video frame and the previous closest I frame, videoFrameRate is the video frame rate of the video stream, $V\_IThresh_{t\_frame}$ is the I-frame threshold of the current video frame, $V\_IThresh_{t-1\_frame}$ is the I-frame threshold of the previous first video frame, ScaledFactor1 is the first scale factor, and ScaledFactor2 is the second scale factor. For example, ScaledFactor1 is 0.995, and ScaledFactor2 is 0.985.

Furthermore, a scale factor when V_FDI is excessively greater than videoFrameRate may further be set. For example, the scale factor when V_FDI>2×videoFrameRate is set to 1, that is, $V\_IThresh_{t\_frame}=V\_IThresh_{t-1\_frame}$.

Alternatively, when V_FDI is greater than videoFrameRate, $V\_IThresh_{t\_frame}$ may be set to be not less than a threshold value, that is, $V\_IThresh_{t\_frame}=\max(V\_IThresh_{t-1\_frame} \times ScaledFactor1, MIN\_VALUE)$, where MIN_VALUE is a preset threshold value, for example, 500, or is a value obtained according to a code rate and a video frame rate, that is, may be adaptively adjusted.

It should be noted that, if the current video frame is the second video frame of the video stream, the previous second video frame of the current video frame does not exist. This is the case in which the previous second video frame of the current video frame is not the previous closest I frame.

Furthermore, if the previous second video frame of the current video frame is not the previous closest I frame, a result of multiplying the I-frame threshold of the previous first video frame by a constant related to the video frame rate may further be used as the I-frame threshold of the current video frame.

Furthermore, the I-frame threshold of each video frame except the first video frame may further be obtained by referring to the foregoing method.

104. Determine whether the previous first video frame is an I frame according to the change feature value of the current video frame, a change feature value of the previous first video frame, the I-frame threshold of the current video frame, the size of the current video frame, the size of the previous first video frame, and a size of a previous second video frame adjacent to the previous first video frame.

Specifically, if a ratio of the size of the previous first video frame to the size of the previous second video frame or a ratio of the size of the previous first video frame to the size of the current video frame is greater than a second constant, the change feature value of the current video frame is greater than the I-frame threshold of the current video frame, and the change feature value of the previous first video frame is greater than the I-frame threshold of the current video frame, it is determined that the previous first video frame is an I frame, and otherwise it is determined that the previous first video frame is not an I frame.

The second constant may be a default fixed value, for example, 1.5. Optionally, the second constant is determined according to the code rate, the video frame rate and the location of the current video frame, that is, may be adaptively adjusted.

It should be noted that, if the current video frame is the second video frame of the video stream, that is, the previous first video frame is the first video frame, it is determined that the previous first video frame is an I frame. That is, the first video frame is an I frame by default.

Furthermore, after it is determined that the previous first video frame is an I frame, the method may further include:

calculating an average size of each I frame.

Specifically, every time one I frame is detected, the average size of each I frame is updated.

Furthermore, from the current video frame being the second video frame to the current video frame being the last video frame, the foregoing method is used to determine whether the previous first video frame of the current video frame is an I frame. Furthermore, if the current video frame is the last video frame of the video stream, the method further includes:

if a ratio of the size of the current video frame to the average size of each I frame is greater than a third constant, determining that the current video frame is an I frame, and otherwise determining that the current video frame is not an I frame, where the third constant is greater than 0.

Specifically, whether the current video frame is the last video frame may be determined by whether a subsequent video frame of the video stream is received, or may also be determined by using a video frame end indication. The third constant may be a default fixed value, for example, 0.75, or optionally, may further be determined according to the code rate, the video frame rate, and the location of the current video frame, that is, may be adaptively adjusted.

Furthermore, before 101, the method further includes:
obtaining a size of the first video frame;
determining that a change feature value of the first video frame is a product of the size of the first video frame and a fourth constant, where a value range of the fourth constant is (0,1]; and
determining that an I-frame threshold of the first video frame equals the change feature value of the first video frame.

Specifically, because the first video frame is determined by a receiving order, the received first video frame of the video stream is the first video frame; therefore, for the first video frame, a case in which the entire frame is lost does not exist, and a packet loss before the first RTP packet is received is usually not considered. Therefore, a size of the first video frame may be determined by referring to no packet loss and the first, third, and fifth cases of the packet loss in 101. The fourth constant may be, for example, ⅔. It should be further noted that the current video frame and the previous first video frame specifically refer to an order of two adjacent video frames and are not limited to a current video frame and a previous first video frame in an actual time order, and the foregoing method is applicable to the obtaining of a change feature value, the obtaining of an I-frame threshold, and the determining of a frame type for any two adjacent video frames. In other words, related processing steps, that is, the obtaining of the change feature value, the obtaining of the I-frame threshold, and the determining of the frame type, may be started at a random time point for two adjacent video frames before the random time point or two adjacent video frames after the random time point or two adjacent video frames at the random time point.

It should be noted that, this embodiment of the present invention is also applicable to scenarios in which a video stream is transmitted by using other IP protocols.

In this embodiment of the present invention, a change feature value of a current video frame is obtained according to sizes of the current video frame and a previous first video frame, an I-frame threshold of the current video frame is obtained according to a video frame rate and a location of the current video frame, and it is determined whether the previous first video frame is an I frame according to the change feature value of the current video frame and a change feature value of the previous first video frame, the I-frame threshold of the current video frame, and the size of the current video frame, the size of the previous first video frame, and a size of a previous second video frame. This provides a complete and effective frame type detection method, and only one video frame before the previous first video frame is considered, that is, the previous second video frame, during detection of a frame type of the previous first video frame. This solves problems of high complexity and long delay due to calculating based on a plurality of previous video frames in existing video frame type detection, and impact of a video frame rate is fully considered, making a result of the detection more accurate.

Figure 3:
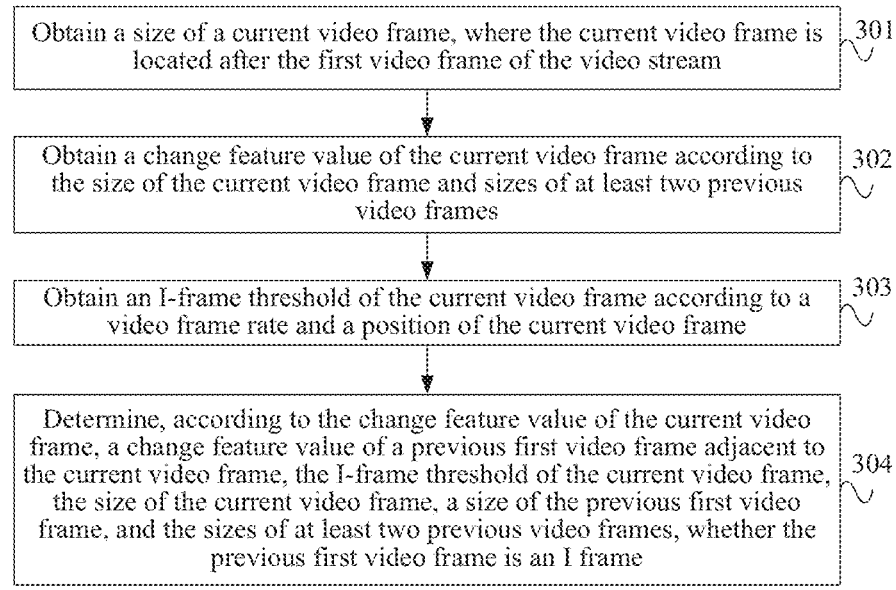
FIG. 3 is a schematic flow chart of another frame type detection method for a video stream according to an embodiment of the present invention.

FIG. 3 is a schematic flow chart of another frame type detection method for a video stream provided by an embodiment of the present invention. As shown in FIG. 3, the method includes:

301. Obtain a size of a current video frame, where the current video frame is located after the first video frame of the video stream.

For a specific implementation of 301, refer to 101 in the foregoing embodiment.

302. Obtain a change feature value of the current video frame according to the size of the current video frame and sizes of at least two previous video frames.

Specifically, an absolute value of an average value of difference values between the size of the current video frame and the sizes of the at least two previous video frames or an average value of the absolute values of the difference values between the size of the current frame and the sizes of the at least two previous video frames may be used as the change feature value of the current video frame.

303. Obtain an I-frame threshold of the current video frame according to a video frame rate and a location of the current video frame.

For a specific implementation of 303, refer to 103 in the foregoing embodiment.

304. Determine, according to the change feature value of the current video frame, a change feature value of a previous first video frame adjacent to the current video frame, the I-frame threshold of the current video frame, the size of the current video frame, and the sizes of the at least two previous video frames, whether the previous first video frame is an I frame.

Specifically, if a ratio of the size of the previous first video frame to the size of the previous second video frame adjacent to the previous first video frame or a ratio of the size of the previous first video frame to the size of the current video frame is greater than a second constant, the change feature value of the current video frame is greater than the I-frame threshold of the current video frame, and the change feature value of the previous first video frame is greater than the I-frame threshold of the current video frame, it is determined that the previous first video frame is an I frame, and otherwise it is determined that the previous first video frame is not an I frame; or, if a ratio of the size of the previous first video frame to the average value of sizes of at least two previous video frames before the previous first video frame or a ratio of the size of the previous first video frame to the size of the current video frame is greater than a second constant, the change feature value of the current video frame is greater than the I-frame threshold of the current video frame, and the change feature value of the previous first video frame is greater than the I-frame threshold of the current video frame, it is determined that the previous first video frame is an I frame, and otherwise it is determined that the previous first video frame is not an I frame.

The second constant may be a default fixed value, for example, 1.5. Optionally, the second constant is determined according to a code rate, the video frame rate, and the location of the current video frame, that is, may be adaptively adjusted.

It should be noted that, if the current video frame is the second video frame in the received the video stream after frame type detection of the video stream is started, that is, the previous first video frame is the first video frame, it is determined that the previous first video frame is an I frame. That is, the first video frame is an I frame by default.

Furthermore, after it is determined that the previous first video frame is an I frame, the method may further include:
calculating an average size of each I frame.

Specifically, every time one I frame is detected, the average size of each I frame is updated.

Furthermore, from the current video frame being the second video frame to the current video frame being the last video frame, the foregoing method is used to determine whether the previous first video frame of the current video frame is an I frame. Furthermore, if the current video frame is the last video frame of the video stream, the method further includes:

if a ratio of the size of the current video frame to the average size of each I frame is greater than a third constant, determining that the current video frame is an I frame, and otherwise determining that the current video frame is not an I frame, where the third constant is greater than 0.

Specifically, whether the current video frame is the last video frame may be determined by whether a subsequent video frame of the video stream is received, or may also be determined by using a video frame end indication. The third constant may be a default fixed value, for example, 0.75, or optionally, may further be determined according to the code rate, the video frame rate, and the location of the current video frame, that is, may be adaptively adjusted.

Furthermore, before 301, the method may further include:
obtaining a size of the first video frame;
determining that a change feature value of the first video frame is a product of the size of the first video frame and a fourth constant, where a value range of the fourth constant is (0,1]; and
determining that an I-frame threshold of the first video frame equals the change feature value of the first video frame.

Specifically, because the first video frame is determined by a receiving order, the received first video frame of the video stream is the first video frame; therefore, for the first video frame, a case in which the entire frame is lost does not exist, and a packet loss before the first RTP packet is received is usually not considered. Therefore, a size of the first video frame may be determined by referring to no packet loss and the first, third, and fifth cases of the packet loss in 101. The fourth constant may be, for example, ⅔.

In this embodiment of the present invention, a change feature value of a current video frame is obtained according to sizes of the current video frame and at least two previous video frames, an I-frame threshold of the current video frame is obtained according to a video frame rate and a location of the current video frame, and it is determined according to the change feature value of the current video frame and a change feature value of a previous first video frame, the I-frame threshold of the current video frame, the sizes of the current video frame and the at least two previous video frames whether the previous first video frame is an I frame. This provides a complete and effective frame type detection method; impact of a video frame rate is fully considered, making a result of the detection more accurate.

A pseudocode example of implementing a frame type detection method for a video stream provided by an embodiment of the present invention is as follows, where V_TNF indicates that the total number of video frames include the number of lost and received video frames. For example, 1 indicates the first video frame, and 2 indicates the second video frame.

Pseudo code is shown below:

```
int t_frame_size = 0, where t_frame_size indicates a size of a current video frame;
int t-1_frame_size = 0, where t-1_frame_size indicates a size of a previous first video frame;
int t-2_frame_size = 0, where t-2_frame_size indicates a size of a previous second video frame;
//==== Input module ====//
    IF (V_TNF == 1) THEN
        //The current video frame is the first video frame
        t_frame_size = VFBytes_{t_frame}
        t-1_frame_size = t_frame_size
        t-2_frame_size = t-1_frame_size
    ELSEIF (V_TNF == 2) THEN
        //The current video frame is the second video frame
        t_frame_size = VFBytes_{t_frame}
        t-1_frame_size = VFBytes_{t-1_frame}
        t-2_frame_size = t-1_frame_size
    ELSE
        //The current video frame is a subsequent video frame
        t_frame_size = VFBytes_{t_frame}
        t-1_frame_size = VFBytes_{t-1_frame}
        t-2_frame_size = VFBytes_{t-2_frame}
    ENDIF
//==== Input module ====//
//==== Video frame feature extraction module ====//
    IF (V_TNF == 1) THEN
        //If the current video frame is the first video frame, V_FG equals 2/3 of the size of the current video frame
        V_FG_{t_frame} = (int)( t_frame_size · 2.0/3.0)
    ELSE
        //The subsequent video frame, and V_FG equals an absolute value of a difference value between the size of the current video frame and a size of a next video frame
        V_FG_{t_frame} = (abs)( t_frame_size - t-1_frame_size )
    ENDIF
//==== Video frame feature extracting module ====//
//==== I-frame threshold calculation module ====//
    IF (V_TNF == 1) THEN
        //If the current video frame is the first video frame, the I-frame threshold equals V_FG
        V_IThresh_{t_frame} = V_FG_{t_frame}
    ELSE
        //Subsequent video frame
        IF (V_FT_{t-2_frame} == I_FRAME) THEN
```

```
            //If the current video frame is an I frame of the previous second video
frame, re-calculate the I-frame threshold and reset V_FDI
                V_FDI = 2//Reset a distance V_FDI between the current video frame and
one previous closest I frame to be 2
                V_IThresh_{t_frame} = (int)( t-2_frame_size · 2.0/3.0)//Re-calculate the
I-frame threshold, which equals 2/3 of the size of the previous second video frame
            ELSE
                //Update the threshold according to a location of the current video frame
and a video frame rate
                IF (V_FDI ≤ (int)videoFrameRate ) THEN
                    V_IThresh_{t_frame} = V_IThresh_{t-1_frame} · 0.985//Update the threshold
                    V_FDI += 1//Calculate the distance from the current video
frame
                ELSE
                    V_IThresh_{t_frame} = max( V_IThresh_{t-1_frame} · 0.995, 500)//Update the
threshold, where the minimum value is 500
                    V_FDI += 1//Calculate the distance between the current video
frame and one previous closest I frame
                ENDIF//IF (V_FDI ≤ (int)videoFrameRate )
            ENDIF//(V_FTt-2_frame == I_FRAME)
        ENDIF//IF (V_TNF == 1)
    //==== I-frame threshold calculation module ====//
    //==== Output module ====//
    IF( V_TNF == 1) THEN
        //first frame
        //The first video frame is not calculated
        return
    ELSE
        IF(V_FG_{t_frame} > V_IThresh_{t_frame} && V_FG_{t-1_frame} > V_IThresh_{t_frame}
        && (t-1_frame_size/t-2_frame_size > 1.5 || t-1_frame_size/t_frame_size > 1.5))
THEN
            V_FT_{t-1_frame} = I_FRAME //I frame
            V_ NIF += 1    //I-frame quantity count value
            V_TIFBytes += t-1_frame_size    //I-frame size accumulated value
        ELSE
            IF( V_TNF - 1 = = 1) THEN
                //If the previous first video frame is the first video frame
                V_FT_{t-1_frame} = I_FRAME   //I frame
                V_ NIF += 1   //I-frame quantity count value
                    V_TIFBytes += t-1_frame_size    //I-frame size accumulated value
            ELSE
                VFT_{t-1_frame} = NON_I_FRAME   //Non-I frame
            ENDIF
        ENDIF
    ENDIF
    IF (last video frame of video stream ) THEN
        //last frame
        //the last video frame
        V_AIFBytes = V_TIFBytes/V_TNFI         //The average size of each I frame till the
last video frame
        IF ( t_frame_size/V_AIFBytes > 0.75 ) THEN
            V_FT_{t_frame} = I_FRAME          //I frame
            V_ NIF += 1                       //I-frame quantity count value
            V_TIFBytes += t_frame_size        //I-frame size accumulated value
            V_AIFBytes = V_TIFBytes/V_NIF     //Update the average size of each
I frame
        ELSE
            V_FT_{t_frame} = NON_I_FRAME     //Non-I frame
        ENDIF
    ENDIF
    //==== Output module ====//
```

Figure 4:
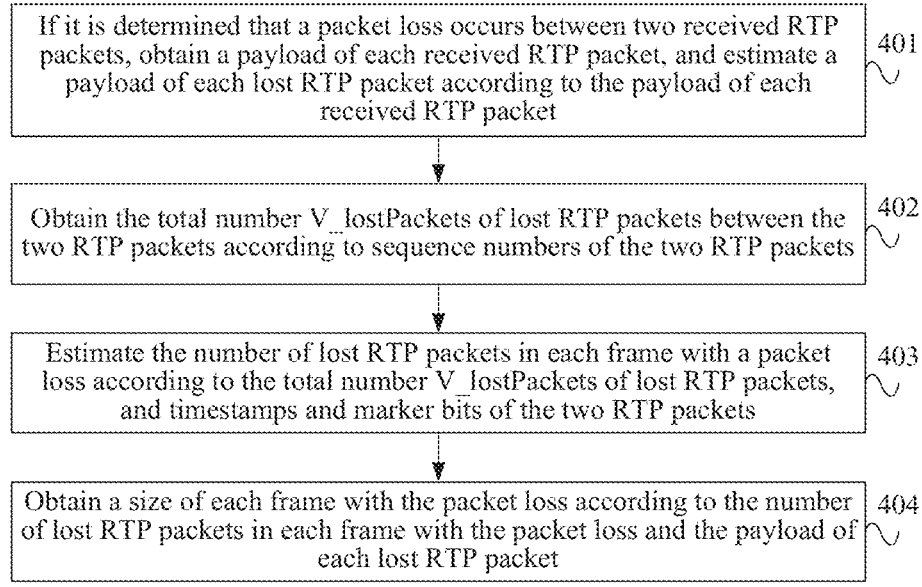
FIG. 4 is a schematic flow chart of a frame size detection method according to an embodiment of the present invention.

FIG. 4 is a schematic flow chart of a frame size detection method provided by an embodiment of the present invention. As shown in FIG. 4, the method includes:

401. If it is determined that a packet loss occurs between two received RTP packets, obtain a payload of each received RTP packet, and estimate a payload of each lost RTP packet according to the payload of each received RTP packet.

Specifically, a frame size detection apparatus provided by this embodiment of the present invention detects a size of a frame. The frame size detection apparatus may be disposed in a network device or a test device, receive a media stream, where the media stream includes a video frame and/or an audio frame. This embodiment may be used to detect a size of the video frame or the audio frame. A video frame includes at least one video RTP packet, an audio frame includes at least one audio RTP packet. The format of an RTP packet is shown in FIG. 1, and a video RTP packet and an audio RTP packet may be distinguished by using a payload type (payload type) of an RTP packet header layer and/or a destination port (destination port) of a User Datagram Protocol (User Datagram Protocol, UDP for short) layer for encapsulating an RTP packet.

Specifically, as shown in FIG. 1, a payload of an RTP packet=a size of the RTP packet−a size of an RTP packet header layer, where the size of the RTP packet may be obtained from information about an upper layer protocol (that is, UDP layer) for encapsulating the RTP packet, and the size of the RTP packet header layer may be determined by receiving the RTP packet and then parsing the packet header layer.

Specifically, the payload V_lostBytes of each lost RTP packet may be estimated according to an average value of a payload of a previous adjacent RTP packet and a payload of a next adjacent RTP packet by referring to Formula (6). In addition, the payload of each lost RTP packet may further be estimated according to an average value of payloads of a plurality of received RTP packets before the lost RTP packet, for example, an average value of payloads of all RTP packets received before the lost RTP packet, or an average value of payloads of RTP packets received inside a sliding window before the lost RTP packet.

402. Obtain the total number V_lostPackets of lost RTP packets between the two RTP packets according to sequence numbers of the two RTP packets.

Specifically, V_lostPackets may be obtained by referring to Formula (1) or (2).

403. Estimate the number of lost RTP packets in each frame with a packet loss according to the total number V_lostPackets of lost RTP packets, and timestamps and marker bits of the two RTP packets.

Specifically, there are the following five cases in which a packet loss occurs between two consecutively received RTP packets.

First case: It is determined according to timestamps of the two RTP packets that the two RTP packets belong to a same frame, so that it is determined that a packet loss occurs in a frame to which the two RTP packets belong but the entire frame is not lost, and the number of lost RTP packets in the frame to which the two RTP packets belong equals the total number V_lostPackets of lost RTP packets. Refer to FIG. 2A for details.

Second case: It is determined according to timestamps and marker bits of the two RTP packets that the two RTP packets separately belong to two consecutive frames and the former RTP packet is the last RTP packet in a frame to which the former RTP packet belongs, so that it is determined that a packet loss occurs in a frame to which the latter RTP packet belongs but the entire frame is not lost, and the number of lost RTP packets in the frame to which the latter RTP packet belongs equals the total number V_lostPackets of lost RTP packets. Refer to FIG. 2B for details.

Third case: It is determined according to timestamps and marker bits of the two RTP packets that the two RTP packets separately belong to two consecutive frames and the former RTP packet is not the last RTP packet in a frame to which the former RTP packet belongs, so that it is determined that a packet loss occurs in both the frame to which the former RTP packet belongs and a frame to which the later RTP packet belongs but the entire frame is not lost, and the number of lost RTP packets in the frame to which the former RTP packet belongs is int(V_lostPackets/2)+V_lostPackets%2, and the number of lost RTP packets in the frame to which the latter RTP packet belongs is int(V_lostPackets/2). Refer to FIG. 2C to FIG. 2E for details.

Fourth case: It is determined according to timestamps and marker bits of the two RTP packets that the two RTP packets belong to different frames and frames to which the two RTP packets belong are nonconsecutive, and the former RTP packet is the last RTP packet in a frame to which the former RTP packet belongs, so that the number V_lostFrames of lost entire frames between the frames to which the two RTP packets belong is obtained according to a video frame rate, a clock rate of an RTP packet, and the timestamps of the two RTP packets; it is determined that a packet loss occurs in V_lostFrames frames between the frames to which the two RTP packets belong and an entire frame is lost, and a packet loss occurs in a frame to which the latter RTP packet belongs but an entire frame is not lost, and it is determined that the number of lost RTP packets in each lost entire frame is int(V_lostPackets/V_lostFrames), and the number of lost RTP packets in the frame to which the latter RTP packet belongs is V_lostPackets%V_lostFrames. Refer to FIG. 2F and FIG. 2G for details.

Fifth case: It is determined according to timestamps and marker bits of the two RTP packets that the two RTP packets belong to different frames and frames to which the two RTP packets belong are nonconsecutive, and the former RTP packet is not the last RTP packet in a frame to which the former RTP packet belongs, so that the number V_lostFrames of lost entire frames between the frames to which the two RTP packets belong is obtained according to a video frame rate, a clock rate of an RTP packet, and the timestamps of the two RTP packets; it is determined that a packet loss occurs in V_lostFrames frames between the frames to which the two RTP packets belong and an entire frame is lost, a packet loss occurs in the frames to which the two RTP packets belong but an entire frame is not lost, and it is determined that the number of lost RTP packets in the frame to which the former RTP packet belongs is 1, the number of lost RTP packets in each lost entire frame is int((V_lostPackets−1)/V_lostFrames), and the number of lost RTP packets in a frame to which the latter RTP packet belongs is (V_lostPackets−1)%V_lostFrames. Refer to FIG. 2H and FIG. 2I for details.

For a specific implementation of 403, refer to 101 in the frame type detection method provided by the foregoing embodiment of the present invention.

404. Obtain a size of each frame with the packet loss according to the number of lost RTP packets in each frame with the packet loss and the payload of each lost RTP packet.

Specifically, for a frame in which a packet loss occurs but the entire frame is not lost, a total size of lost RTP packets in the frame is obtained according to the number of lost RTP packets in the frame and a payload of each lost RTP packet; also, a payload of each received RTP packet in the frame is obtained, and the payload of each received RTP packet is accumulated to obtain a total size of the received RTP packets in the frame; the total size of the lost RTP packets and the total size of the received RTP packets in the frame are added to obtain a size of the frame.

For a lost entire frame, a size of the frame is determined directly according to the number of lost RTP packets in the frame and a payload of each lost RTP packet.

In this embodiment of the present invention, if it is determined that a packet loss occurs between two received RTP packets, a payload of each lost RTP packet is estimated according to a payload of each received RTP packet, the total number of lost RTP packets between the two RTP packets is obtained according to sequence numbers of the two RTP packets, and then the number of lost RTP packets in each frame with a packet loss is estimated according to the total number V_lostPackets of lost RTP packets, and the timestamps and marker bits of the two RTP packets, so that a size of each frame with the packet loss is obtained according to the number of lost RTP packets in each frame with the packet loss and the payload of each lost RTP packet. This provides an effective solution of detecting a size of a frame with a packet loss.

A person of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program code, such as a ROM, a RAM, a magnetic disk, and an optical disc.

Figure 5:
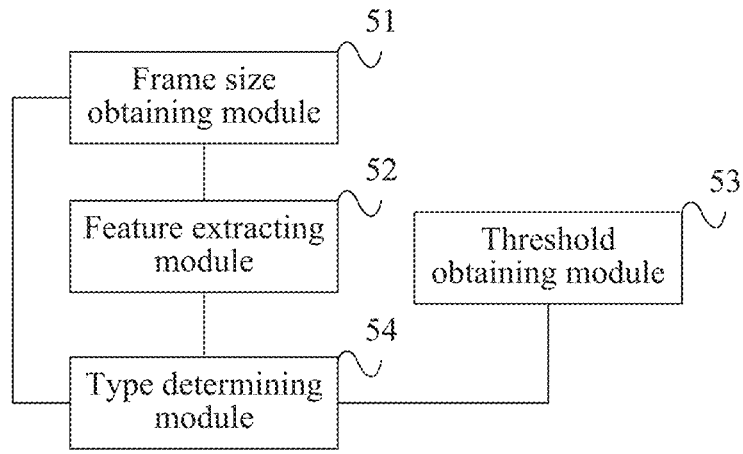
FIG. 5 is a schematic structural diagram of a frame type detection apparatus for a video stream according to an embodiment of the present invention.

FIG. 5 is a schematic structural diagram of a frame type detection apparatus for a video stream provided by an embodiment of the present invention. As shown in FIG. 5, the apparatus includes:

a frame size obtaining module 51, configured to obtain a size of a current video frame, where the current video frame is located after the first video frame of the video stream;

a feature extracting module 52, configured to obtain a change feature value of the current video frame according to the size of the current video frame and a size of a previous first video frame adjacent to the current video frame;

a threshold obtaining module 53, configured to obtain an I-frame threshold of the current video frame according to a video frame rate and a location of the current video frame; and a type determining module 54, configured to determine whether the previous first video frame is an I frame according to the change feature value of the current video frame, a change feature value of the previous first video frame, the I-frame threshold of the current video frame, the size of the current video frame, the size of the previous first video frame, and a size of a previous second video frame adjacent to the previous first video frame.

Optionally, the frame size obtaining module 51 is specifically configured to:

if it is determined that a packet loss does not occur in the current video frame, obtain a payload of each RTP packet in the current video frame; and accumulate the payload of each RTP packet in the current video frame to obtain the size of the current video frame.

Optionally, the frame size obtaining module 51 specifically includes:

a received size obtaining unit, configured to: if it is determined that a packet loss occurs in the current video frame and the entire frame is not lost, obtain a payload of each received RTP packet in the current video frame, and accumulate the payload of each received RTP packet in the current video frame to obtain a total size of the received RTP packets in the current video frame;

a lost size obtaining unit, configured to estimate a payload of each lost RTP packet and the number of lost RTP packets in the current video frame according to a previous adjacent RTP packet of a lost RTP packet and a next adjacent RTP packet of the lost RTP packet in the current video frame among all received RTP packets, and obtain a total size of the lost RTP packets in the current video frame according to a payload of each lost RTP packet and the number of lost RTP packets in the current video frame; and a frame size obtaining unit, configured to add the total size of the received RTP packets and the total size of the lost RTP packets in the current video frame to obtain the size of the current video frame.

Furthermore, the lost size obtaining unit is specifically configured to:

obtain a payload of the previous adjacent RTP packet and a payload of the next adjacent RTP packet; and estimate the payload of each lost RTP packet according to the average value of the payload of the previous adjacent RTP packet and the payload of the next adjacent RTP packet.

Furthermore, the lost size obtaining unit is specifically further configured to:

if it is determined according to timestamps of the previous adjacent RTP packet and the next adjacent RTP packet that both the previous adjacent RTP packet and the next adjacent RTP packet belong to the current video frame, or, if it is determined according to timestamps and marker bits of the previous adjacent RTP packet and the next adjacent RTP packet that the previous adjacent RTP packet belongs to the previous first video frame, the next adjacent RTP packet belongs to the current video frame, and the previous adjacent RTP packet is the last RTP packet in the previous first video frame, obtain the total number V_lostPackets of lost RTP packets between the previous adjacent RTP packet and the next adjacent RTP packet according to sequence numbers of the previous adjacent RTP packet and the next adjacent RTP packet; and determine that the number of lost RTP packets in the current video frame is V_lostPackets.

Optionally, the lost size obtaining unit is specifically further configured to:

if it is determined according to timestamps and marker bits of the previous adjacent RTP packet and the next adjacent RTP packet that the previous adjacent RTP packet belongs to the current video frame, the next adjacent RTP packet belongs to a next video frame adjacent to the current video frame, and the previous adjacent RTP packet is not the last RTP packet in the current video frame, obtain the total number V_lostPackets of lost RTP packets between the previous adjacent RTP packet and the next adjacent RTP packet according to sequence numbers of the previous adjacent RTP packet and the next adjacent RTP packet; and determine that the number of lost RTP packets in the current video frame is int(V_lostPackets/2)+V_lostPackets%2.

Optionally, the lost size obtaining unit is specifically further configured to:

if it is determined according to timestamps and marker bits of the previous adjacent RTP packet and the next adjacent RTP packet that a video frame to which the previous adjacent RTP packet belongs and the current video frame are nonconsecutive, the next adjacent RTP packet belongs to the current video frame, and the previous adjacent RTP packet is the last RTP packet in the video frame to which the previous adjacent RTP packet belongs, obtain the number V_lostFrames of lost video frames between the previous adjacent RTP packet and the next adjacent RTP packet and the total number V_lostPackets of lost RTP packets according to a video frame rate, a clock rate of an RTP packet, and sequence numbers and timestamps of the previous adjacent RTP packet and the next adjacent RTP packet; and determine that the number of lost RTP packets in the current video frame is V_lostPackets%V_lostFrames.

Optionally, the lost size obtaining unit is specifically further configured to:

if it is determined according to timestamps and marker bits of the previous adjacent RTP packet and the next adjacent RTP packet that the previous adjacent RTP packet belongs to the current video frame, a video frame to which the next adjacent RTP packet belongs and the current video frame are nonconsecutive, and the previous adjacent RTP packet is not the last RTP packet in the current video frame, determine that the number of lost RTP packets in the current video frame is 1.

Optionally, the frame size obtaining module 54 is specifically configured to:

if it is determined the entire current video frame is lost, estimate a payload of each lost RTP packet according to a previous adjacent RTP packet and a next adjacent RTP packet of the current video frame among all received RTP packets, obtain the number V_lostFrames of lost video frames between a video frame to which the previous adjacent RTP packet belongs and a video frame to which the next adjacent RTP packet belongs and the total number V_lostPackets of lost RTP packets according to a video frame rate, a clock rate of an RTP packet, and timestamps and sequence numbers of the previous adjacent RTP packet and the next adjacent RTP packet; and if it is determined according to a marker bit of the previous adjacent RTP packet that the previous adjacent RTP packet is the last RTP packet in the video frame to which the previous adjacent RTP packet belongs, determine that the number of RTP packets in the current video frame is int(V_lostPackets/V_lostFrames), and otherwise determine that the number of RTP packets in the current video frame is int((V_lostPackets−1)/V_lostFrames); and determine the size of the current video frame according to the number of RTP packets in the current video frame and a payload of each lost RTP packet.

Furthermore, the feature extracting module 52 is specifically configured to:

use an absolute value of a difference value between the size of the current video frame and the size of the previous first video frame as the change feature value of the current video frame.

Furthermore, the threshold obtaining module 53 is specifically configured to:

obtain the I-frame threshold of the current video frame according to the video frame rate and a distance between the current video frame and a previous closest I frame.

Furthermore, threshold obtaining module 53 is specifically configured to:

if the previous second video frame is the previous closest I frame, determine that the I-frame threshold of the current video frame is a product of a size of the previous closest I-frame and a first constant, where a value range of the first constant is (0,1].

Optionally, the threshold obtaining module 53 is specifically configured to:

if the previous second video frame is not the previous closest I frame, determine whether the distance between the current video frame and the previous closest I-frame is greater than the video frame rate, if greater than, determine a product of an I-frame threshold of the previous first video frame and a first scale factor as the I-frame threshold of the current video frame, and if not greater than, determine the product of the I-frame threshold of the previous first video frame and a second scale factor as the I-frame threshold of the current video frame; where a value range of the first scale factor and the second scale factor is both (0,1], and the first scale factor is greater than the second scale factor.

Furthermore, the type determining module 54 is specifically configured to:

if a ratio of the size of the previous first video frame to the size of the previous second video frame or a ratio of the size of the previous first video frame to the size of the current video frame is greater than a second constant, the change feature value of the current video frame is greater than the I-frame threshold of the current video frame, and the change feature value of the previous first video frame is greater than the I-frame threshold of the current video frame, determine that the previous first video frame is an I frame, and otherwise determine that the previous first video frame is not an I frame.

Furthermore, the type determining module 54 is specifically configured to:

if the current video frame is the second video frame, determine that the previous first video frame is an I frame.

Optionally, the second constant is determined according to a code rate, a frame rate, and the location of the current video frame.

Furthermore, the apparatus further includes:

an average value calculating module, configured to: after the type determining module 54 determines that the previous first video frame is an I frame, calculate an average size of each I frame.

Furthermore, if the current video frame is the last video frame in the video stream, the type determining module 54 is further configured to:

if a ratio of the size of the current video frame to the average size of each I frame is greater than a third constant, determine that the current video frame is an I frame, and otherwise determine that the current video frame is not an I frame, where the third constant is greater than 0.

Furthermore, the frame size obtaining module 51 is further configured to: obtain a size of the first video frame.

The feature extracting module 52 is further configured to: determine that the change feature value of the first video frame is a product of the size of the first video frame and a fourth constant, where a value range of the fourth constant is (0,1].

The threshold obtaining module 53 is further configured to: determine an I-frame threshold of the first video frame equals the change feature value of the first video frame.

For a specific implementation of this embodiment, refer to the video frame type detection method provided by the foregoing embodiment of the present invention. In this embodiment of the present invention, a change feature value of a current video frame is obtained according to sizes of the current video frame and a previous first video frame, an I-frame threshold of the current video frame is obtained according to a video frame rate and a location of the current video frame, it is determined whether the previous first video frame is an I frame according to the change feature value of the current video frame and a change feature value of the previous first video frame, the I-frame threshold of the current video frame, and the size of the current video frame, the size of the previous first video frame, and a size of a previous second video frame. This provides a complete and effective frame type detection method, and also make it possible to only consider one video frame before the previous first video frame, that is, the previous second video frame, during the detection of the frame type of the previous first video frame. This solves problems of high complexity and long delay due to calculating based on a plurality of previous video frames in existing video frame type detection, and impact of a video frame rate is fully considered, making a result of the detection more accurate.

Figure 6:
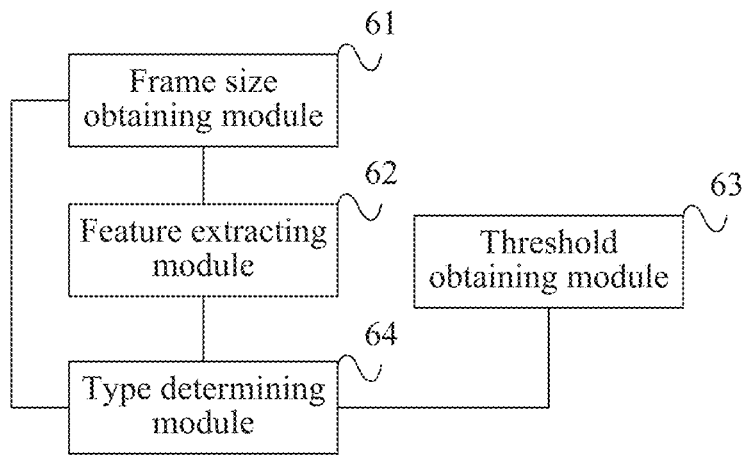
FIG. 6 is a schematic structural diagram of another frame type detection apparatus for a video stream according to an embodiment of the present invention.

FIG. 6 is a schematic structural diagram of another frame type detection apparatus for a video stream provided by an embodiment of the present invention. As shown in FIG. 6, the apparatus includes:

a frame size obtaining module 61, configured to obtain a size of a current video frame, where the current video frame is located after the first video frame of the video stream;

a feature extracting module 62, configured to obtain a change feature value of the current video frame according to the size of the current video frame and sizes of at least two previous video frames;

a threshold obtaining module 63, configured to obtain an I-frame threshold of the current video frame according to a video frame rate and a location of the current video frame; and a type determining module 64, configured to determine, according to the change feature value of the current video frame, a change feature value of a previous first video frame adjacent to the current video frame, the I-frame threshold of the current video frame, the size of the current video frame, and the sizes of the at least two previous video frames, whether the previous first video frame is an I frame.

Optionally, the frame size obtaining module 61 is specifically configured to:

if it is determined that a packet loss does not occur in the current video frame, obtain a payload of each RTP packet in the current video frame; and accumulate the payload of each RTP packet in the current video frame to obtain the size of the current video frame.

Optionally, the frame size obtaining module 61 specifically includes:

a received size obtaining unit, configured to: if it is determined that a packet loss occurs in the current video frame and the entire frame is not lost, obtain a payload of each received RTP packet in the current video frame, accumulate the payload of each received RTP packet in the current video frame to obtain the total size of the received RTP packets in the current video frame;

a lost size obtaining unit, configured to estimate a payload of each lost RTP packet and the number of lost RTP packets in the current video frame according to a previous adjacent RTP packet of a lost RTP packet and a next adjacent RTP packet of the lost RTP packet in the current video frame among all received RTP packets, and obtain a total size of the lost RTP packets in the current video frame according to a payload of each lost RTP packet and the number of lost RTP packets in the current video frame; and a frame size obtaining unit, configured to add the total size of the received RTP packets and the total size of the lost RTP packets in the current video frame to obtain the size of the current video frame.

Furthermore, the lost size obtaining unit is specifically configured to:

obtain a payload of the previous adjacent RTP packet and a payload of the next adjacent RTP packet; and estimate a payload of each lost RTP packet according to the average value of the payload of the previous adjacent RTP packet and the payload of the next adjacent RTP packet.

Optionally, the lost size obtaining unit is specifically further configured to:

if it is determined according to timestamps of the previous adjacent RTP packet and the next adjacent RTP packet that both the previous adjacent RTP packet and the next adjacent RTP packet belong to the current video frame, or, if it is determined according to timestamps and marker bits of the previous adjacent RTP packet and the next adjacent RTP packet that the previous adjacent RTP packet belongs to the previous first video frame, the next adjacent RTP packet belongs to the current video frame, and the previous adjacent RTP packet is the last RTP packet in the previous first video frame, obtain the total number V_lostPackets of lost RTP packets between the previous adjacent RTP packet and the next adjacent RTP packet according to sequence numbers of the previous adjacent RTP packet and the next adjacent RTP packet; and determine that the number of lost RTP packets in the current video frame is V_lostPackets.

Optionally, the lost size obtaining unit is specifically further configured to:

if it is determined according to timestamps and marker bits of the previous adjacent RTP packet and the next adjacent RTP packet that the previous adjacent RTP packet belongs to the current video frame, the next adjacent RTP packet belongs to a next video frame adjacent to the current video frame, and the previous adjacent RTP packet is not the last RTP packet in the current video frame, obtain the total number V_lostPackets of lost RTP packets between the previous adjacent RTP packet and the next adjacent RTP packet according to sequence numbers of the previous adjacent RTP packet and the next adjacent RTP packet; and determine that the number of lost RTP packets in the current video frame is int(V_lostPackets/2)+V_lostPackets%2.

Optionally, the lost size obtaining unit is specifically further configured to:

if it is determined according to timestamps and marker bits of the previous adjacent RTP packet and the next adjacent RTP packet that a video frame to which the previous adjacent RTP packet belongs and the current video frame are nonconsecutive, the next adjacent RTP packet belongs to the current video frame, and the previous adjacent RTP packet is the last RTP packet in the video frame to which the previous adjacent RTP packet belongs, obtain the number V_lostFrames of lost video frames between the previous adjacent RTP packet and the next adjacent RTP packet and the total number V_lostPackets of lost RTP packets according to a video frame rate, a clock rate of an RTP packet, and sequence numbers and timestamps of the previous adjacent RTP packet and the next adjacent RTP packet; and determine that the number of lost RTP packets in the current video frame is V_lostPackets%V_lostFrames.

Optionally, the lost size obtaining unit is specifically further configured to:

if it is determined according to timestamps and marker bits of the previous adjacent RTP packet and the next adjacent RTP packet that the previous adjacent RTP packet belongs to the current video frame, a video frame to which the next adjacent RTP packet belongs and the current video frame are nonconsecutive, and the previous adjacent RTP packet is not the last RTP packet in the current video frame, determine that the number of lost RTP packets in the current video frame is 1.

Optionally, the frame size obtaining module 61 is specifically configured to:

if it is determined that the entire current video frame is lost, estimate a payload of each lost RTP packet according to a previous adjacent RTP packet and a next adjacent RTP packet of the current video frame among all received RTP packets, obtain the number V_lostFrames of lost video frames between a video frame to which the previous adjacent RTP packet belongs and a video frame to which the next adjacent RTP packet belongs and the total number V_lostPackets of lost RTP packets according to a video frame rate, a clock rate of an RTP packet, and timestamps and sequence numbers of the previous adjacent RTP packet and the next adjacent RTP packet;

if it is determined according to the marker bit of the previous adjacent RTP packet that the previous adjacent RTP packet is the last RTP packet in the video frame to which the previous adjacent RTP packet belongs, determine that the number of RTP packets in the current video frame is int(V_lostPackets/V_lostFrames), and otherwise determine that the number of RTP packets in the current video frame is int((V_lostPackets−1)/V_lostFrames); and obtain the size of the current video frame according to the number of RTP packets in the current video frame and a payload of each lost RTP packet.

Furthermore, the feature extracting module 62 is specifically configured to:

use an absolute value of an average value of difference values between the size of the current video frame and the sizes of the at least two previous video frames or an average value of absolute values of the difference values between the size of the current frame and the sizes of the at least two previous video frames as the change feature value of the current video frame.

Furthermore, the threshold obtaining module 63 is specifically configured to:

obtain the I-frame threshold of the current video frame according to the video frame rate and a distance between the current video frame and a previous closest I frame.

Optionally, the threshold obtaining module 63 is specifically configured to:

if a previous second video frame adjacent to the previous first video frame is the previous closest I frame, determine that the I-frame threshold of the current video frame is a product of a size of the previous closest I-frame and a first constant, where a value range of the first constant is (0,1].

Optionally, the threshold obtaining module 63 is specifically configured to:

if the previous second video frame adjacent to the previous first video frame is not the previous closest I frame, determine whether the distance between the current video frame and the previous closest I-frame is greater than the video frame rate, if greater than, determine the product of an I-frame threshold of the previous first video frame and a first scale factor as the I-frame threshold of the current video frame, and if not greater than, determine the product of the I-frame threshold of the previous first video frame and a second scale factor as the I-frame threshold of the current video frame; where a value range of the first scale factor and the second scale factor is both (0,1], and the first scale factor is greater than the second scale factor.

Furthermore, the type determining module 64 is specifically configured to:

if a ratio of the size of the previous first video frame to the size of the previous second video frame or a ratio of the size of the previous first video frame to the size of the current video frame is greater than a second constant, the change feature value of the current video frame is greater than the I-frame threshold of the current video frame, and the change feature value of the previous first video frame is greater than the I-frame threshold of the current video frame, determine that the previous first video frame is an I frame, and otherwise determine that the previous first video frame is not an I frame; or, if a ratio of the size of the previous first video frame to the average value of sizes of at least two previous video frames before the previous first video frame or the ratio of the size of the previous first video frame to the size of the current video frame is greater than a second constant, the change feature value of the current video frame is greater than the I-frame threshold of the current video frame, and the change feature value of the previous first video frame is greater than the I-frame threshold of the current video frame, determine that the previous first video frame is an I frame, and otherwise determine that the previous first video frame is not an I frame.

Furthermore, the type determining module 64 is specifically further configured to:

if the current video frame is the second video frame of the video stream, determine that the previous first video frame is an I frame.

Optionally, the second constant is determined according to a code rate, the video frame rate, and the location of the current video frame.

Furthermore, the apparatus further includes:

an average value calculating module, configured to: after the type determining module 64 determines that the previous first video frame is an I frame, calculate an average size of each I frame.

Furthermore, if the current video frame is the last video frame in the video stream, the type determining module 64 is further configured to:

if a ratio of the size of the current video frame to the average size of each I frame is greater than a third constant, determine that the current video frame is an I frame, and otherwise determine that the current video frame is not an I frame, where the third constant is greater than 0.

Optionally, the frame size obtaining module 61 is further configured to obtain a size of the first video frame;

the feature extracting module 62 is further configured to determine that a change feature value of the first video frame is a product of the size of the first video frame and a fourth constant, where a value range of the fourth constant is (0,1]; and the threshold obtaining module 63 is further configured to determine that an I-frame threshold of the first video frame equals the change feature value of the first video frame.

In this embodiment of the present invention, a change feature value of a current video frame is obtained according to sizes of the current video frame and at least two previous video frames, an I-frame threshold of the current video frame is obtained according to a video frame rate and a location of the current video frame, and it is determined according to the change feature value of the current video frame and a change feature value of a previous first video frame, the I-frame threshold of the current video frame, the sizes of the current video frame and the at least two previous video frames whether the previous first video frame is an I frame. This provides a complete and effective frame type detection method, and impact of a video frame rate is fully considered, making a result of the detection more accurate.

Figure 7:
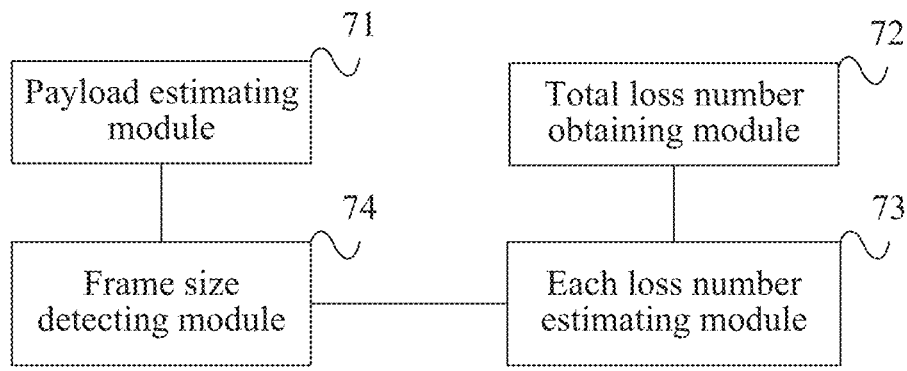
FIG. 7 is a schematic structural diagram of a frame size detection apparatus according to an embodiment of the present invention.

FIG. 7 is a schematic structural diagram of a frame size detection apparatus provided by an embodiment of the present invention. As shown in FIG. 7, the apparatus includes:

a payload estimating module 71, configured to: if it is determined that a packet loss occurs between two received RTP packets, obtain a payload of each received RTP packet, and estimate a payload of each lost RTP packet according to a payload of each received RTP packet;

a total loss number obtaining module 72, configured to obtain the total number V_lostPackets of lost RTP packets between the two RTP packets according to sequence numbers of the two RTP packets;

an each loss number estimating module 73, configured to estimate the number of lost RTP packets in each frame with a packet loss according to the total number of lost RTP packets V_lostPackets, and timestamps and marker bits of the two RTP packets; and a frame size detecting module 74, configured to obtain a size of each frame with the packet loss according to the number of lost RTP packets in each frame with the packet loss and a payload of each lost RTP packet.

Furthermore, the payload estimating module 71 is specifically configured to:

estimate a payload of each lost RTP packet according to an average value of the payload of the two RTP packets; or estimate a payload of each lost RTP packet according to an average value of payloads of a plurality of received RTP packets before a lost RTP packet.

Furthermore, the each loss number estimating module 73 is specifically configured to:

if it is determined according to timestamps of the two RTP packets that the two RTP packets belong to a same frame, or, if it is determined according to the timestamps and marker bits of the two RTP packets that the two RTP packets separately belong to two consecutive frames and the former RTP packet is the last RTP packet in a frame to which the former RTP packet belongs, determine that the number of lost RTP packets in a frame to which the latter RTP packet belongs equals the total number V_lostPackets of lost RTP packets.

Optionally, the each loss number estimating module 73 is specifically configured to:

if it is determined according to the timestamps and marker bits of the two RTP packets that the two RTP packets separately belong to two consecutive frames and the former RTP packet is not the last RTP packet in a frame to which the former RTP packet belongs, determine that the number of lost RTP packets in the frame to which the former RTP packet belongs is int(V_lostPackets/2)+V_lostPackets%2, and the number of lost RTP packets in the frame to which the latter RTP packet belongs is int(V_lostPackets/2).

Optionally, the each loss number estimating module 73 is specifically configured to:

if it is determined according to the timestamps and marker bits of the two RTP packets that the two RTP packets belong to different frames, frames to which the two RTP packets belong are nonconsecutive, and the former RTP packet is the last RTP packet in a frame to which the former RTP packet belongs, determine the number V_lostFrames of lost entire frames between the frames to which the two RTP packets belong according to a video frame rate, a clock rate of an RTP packet, and the timestamps of the two RTP packets; and determine that the number of lost RTP packets in each lost entire frame is int(V_lostPackets/V_lostFrames), and the number of lost RTP packets in a frame to which the latter RTP packet belongs is V_lostPackets%V_lostFrames.

Optionally, the each loss number estimating module 73 is specifically configured to:

if it is determined according to the timestamps and marker bits of the two RTP packets that the two RTP packets belong to different frames, frames to which the two RTP packets belong are nonconsecutive, and the former RTP packet is not the last RTP packet in a frame to which the former RTP packet belongs, determine the number V_lostFrames of lost entire frames between the frames to which the two RTP packets belong according to a video frame rate, a clock rate of an RTP packet, and the timestamps of the two RTP packets; and determine that the number of lost RTP packets in the frame to which the former RTP packet belongs is 1, the number of lost RTP packets in each lost entire frame is int((V_lostPackets−1)/V_lostFrames), and the number of lost RTP packets in a frame to which the latter RTP packet belongs is (V_lostPackets−1)%V_lostFrames.

For a specific implementation of this embodiment, refer to the frame size detection method provided by the foregoing embodiment of the present invention. In this embodiment of the present invention, if it is determined that packet loss occurs between two received RTP packets, a payload of each lost RTP packet is estimated according to a payload of each received RTP packet, the total number of lost RTP packets between the two RTP packets is obtained according to sequence numbers of the two RTP packets, and then the number of lost RTP packets in each frame with a packet loss is estimated according to the total number V_lostPackets of lost RTP packets, and timestamps and marker bits of the two RTP packets, so that a size of each frame with the packet loss is obtained according to the number of lost RTP packets in each frame with the packet loss and a payload of each lost RTP packet, This provides an effective solution of detecting a size of a frame with a packet loss.

Figure 8:
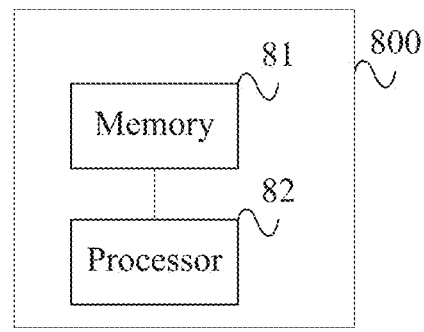
FIG. 8 is a schematic structural diagram of another frame type detection apparatus for a video stream according to an embodiment of the present invention.

FIG. 8 is a schematic structural diagram of another frame type detection apparatus for a video stream provided by an embodiment of the present invention. As shown in FIG. 8, a apparatus 800 includes:

a memory 81, configured to store an instruction; and a processor 82, coupled to the memory, and the processor 82 is configured to execute the instruction stored in the memory 81, where the processor 82 is configured to:

obtain a size of a current video frame, where the current video frame is located after the first video frame of the video stream;

obtain a change feature value of the current video frame according to the size of the current video frame and a size of a previous first video frame adjacent to the current video frame;

obtain an I-frame threshold of the current video frame according to a video frame rate and a location of the current video frame; and determine whether the previous first video frame is an I frame according to the change feature value of the current video frame, a change feature value of the previous first video frame, the I-frame threshold of the current video frame, the size of the current video frame, the size of the previous first video frame, and a size of a previous second video frame adjacent to the previous first video frame.

Optionally, the processor 82 is specifically configured to:

if it is determined that a packet loss does not occur in the current video frame, obtain a payload of each RTP packet in the current video frame; and accumulate the payload of each RTP packet in the current video frame to obtain the size of the current video frame.

Optionally, the processor 82 is specifically configured to:

if it is determined that a packet loss occurs in the current video frame and the entire frame is not lost, obtain a payload of each received RTP packet in the current video frame, and accumulate the payload of each received RTP packets in the current video frame to obtain a total size of the received RTP packets in the current video frame;

estimate a payload of each lost RTP packet and the number of lost RTP packets in the current video frame according to a previous adjacent RTP packet of a lost RTP packet and a next adjacent RTP packet of the lost RTP packet in the current video frame among all received RTP packets, and obtain a total size of the lost RTP packets in the current video frame according to the payload of each lost RTP packet and the number of lost RTP packets in the current video frame; and add the total size of the received RTP packets and the total size of the lost RTP packets in the current video frame to obtain the size of the current video frame.

Furthermore, the processor 82 is specifically configured to:

obtain the payload of the previous adjacent RTP packet and the payload of the next adjacent RTP packet of each lost RTP packet in the current video frame among all the received RTP packets; and estimate a payload of each lost RTP packet according to the average value of the payload of the previous adjacent RTP packet and the payload of the next adjacent RTP packet.

Furthermore, the processor 82 is further specifically configured to:

if it is determined according to timestamps of the previous adjacent RTP packet and the next adjacent RTP packet that both the previous adjacent RTP packet and the next adjacent RTP packet belong to the current video frame, or, if it is determined according to timestamps and marker bits of the previous adjacent RTP packet and the next adjacent RTP packet that the previous adjacent RTP packet belongs to the previous first video frame, the next adjacent RTP packet belongs to the current video frame, and the previous adjacent RTP packet is the last RTP packet in the previous first video frame, obtain the total number V_lostPackets of lost RTP packets between the previous adjacent RTP packet and the next adjacent RTP packet according to sequence numbers of the previous adjacent RTP packet and the next adjacent RTP packet; and determine that the number of lost RTP packets in the current video frame is V_lostPackets.

Optionally, the processor 82 is further specifically configured to:

if it is determined according to timestamps and marker bits of the previous adjacent RTP packet and the next adjacent RTP packet that the previous adjacent RTP packet belongs to the current video frame, the next adjacent RTP packet belongs to a next video frame adjacent to the current video frame, and the previous adjacent RTP packet is not the last RTP packet in the current video frame, obtain the total number V_lostPackets of lost RTP packets between the previous adjacent RTP packet and the next adjacent RTP packet according to sequence numbers of the previous adjacent RTP packet and the next adjacent RTP packet; and determine that the number of lost RTP packets in the current video frame is int(V_lostPackets/2)+V_lostPackets%2.

Optionally, the processor 82 is further specifically configured to:

if it is determined according to timestamps and marker bits of the previous adjacent RTP packet and the next adjacent RTP packet that a video frame to which the previous adjacent RTP packet belongs and the current video frame are nonconsecutive, the next adjacent RTP packet belongs to the current video frame, and the previous adjacent RTP packet is the last RTP packet in the video frame to which the previous adjacent RTP packet belongs, obtain the number V_lostFrames of lost video frames between the previous adjacent RTP packet and the next adjacent RTP packet and the total number V_lostPackets of lost RTP packets according to a video frame rate, a clock rate of an RTP packet, and sequence numbers and timestamps of the previous adjacent RTP packet and the next adjacent RTP packet; and determine that the number of lost RTP packets in the current video frame is V_lostPackets%V_lostFrames.

Optionally, the processor 82 is further specifically configured to:

if it is determined according to timestamps and marker bits of the previous adjacent RTP packet and the next adjacent RTP packet that the previous adjacent RTP packet belongs to the current video frame, a video frame to which the next adjacent RTP packet belongs and the current video frame are nonconsecutive, and the previous adjacent RTP packet is not the last RTP packet in the current video frame, determine that the number of lost RTP packets in the current video frame is 1.

Optionally, the processor 82 is specifically configured to:

if it is determined that the entire current video frame is lost, estimate a payload of each lost RTP packet according to a previous adjacent RTP packet and a next adjacent RTP packet of the current video frame among all received RTP packets, obtain the number V_lostFrames of lost video frames between a video frame to which the previous adjacent RTP packet belongs and a video frame to which the next adjacent RTP packet belongs and the total number V_lostPackets of lost RTP packets according to a video frame rate, a clock rate of an RTP packet, and timestamps and sequence numbers of the previous adjacent RTP packet and the next adjacent RTP packet;

if it is determined according to a marker bit of the previous adjacent RTP packet that the previous adjacent RTP packet is the last RTP packet in the video frame to which the previous adjacent RTP packet belongs, determine that the number of RTP packets in the current video frame is int(V_lostPackets/V_lostFrames), and otherwise determine that the number of RTP packets in the current video frame is int((V_lostPackets−1)/V_lostFrames); and determine the size of the current video frame according to the number of RTP packets in the current video frame and a payload of each lost RTP packet.

Furthermore, the processor 82 is further specifically configured to:

use an absolute value of a difference value between the size of the current video frame and the size of the previous first video frame as the change feature value of the current video frame.

Furthermore, the processor 82 is further specifically configured to:

obtain the I-frame threshold of the current video frame according to the video frame rate and a distance between the current video frame and a previous closest I frame.

Furthermore, the processor 82 is specifically configured to:

if the previous second video frame is the previous closest I frame, determine that the I-frame threshold of the current video frame is a product of a size of the previous closest I frame and a first constant, where a value range of the first constant is (0,1].

Optionally, the processor 82 is specifically configured to:

if the previous second video frame is not the previous closest I frame, determine whether the distance between the current video frame and the previous closest I-frame is greater than the video frame rate, if greater than, determine a product of an I-frame threshold of the previous first video frame and a first scale factor as the I-frame threshold of the current video frame, and if not greater than, determine the product of the I-frame threshold of the previous first video frame and a second scale factor as the I-frame threshold of the current video frame; where a value range of the first scale factor and the second scale factor is both (0,1], and the first scale factor is greater than the second scale factor.

Furthermore, the processor 82 is further specifically configured to:

if a ratio of the size of the previous first video frame to the size of the previous second video frame or a ratio of the size of the previous first video frame to the size of the current video frame is greater than a second constant, the change feature value of the current video frame is greater than the I-frame threshold of the current video frame, and the change feature value of the previous first video frame is greater than the I-frame threshold of the current video frame, determine that the previous first video frame is an I frame, and otherwise determine that the previous first video frame is not an I frame.

Furthermore, the processor 82 is specifically configured to:

if the current video frame is the second video frame, determine that the previous first video frame is an I frame.

Optionally, the second constant is determined according to a code rate, the frame rate, and the location of the current video frame.

Furthermore, the processor 82 is further configured to: after it is determined that the previous first video frame is an I-frame, calculate an average size of each I frame.

Furthermore, if the current video frame is the last video frame in the video stream, the processor 82 is further configured to:

if a ratio of the size of the current video frame to the average size of each I frame is greater than a third constant, determine that the current video frame is an I frame, and otherwise determine that the current video frame is not an I frame, where the third constant is greater than 0.

Furthermore, the processor 82 is further configured to: obtain a size of the first video frame; determine that the change feature value of the first video frame is a product of the size of the first video frame and a fourth constant, where a value range of the fourth constant is (0,1]; and determine that an I-frame threshold of the first video frame equals the change feature value of the first video frame.

For a specific implementation of this embodiment, refer to the video frame type detection method provided by the foregoing embodiment of the present invention. In this embodiment of the present invention, a change feature value of a current video frame is obtained according to sizes of the current video frame and a previous first video frame, an I-frame threshold of the current video frame is obtained according to a video frame rate and a location of the current video frame, and it is determined whether the previous first video frame is an I frame according to the change feature value of the current video frame and a change feature value of the previous first video frame, the I-frame threshold of the current video frame, and the size of the current video frame, the size of the previous first video frame, and a size of a previous second video frame. This provides a complete and effective frame type detection method, and only one video frame before the previous first video frame is considered, that is, the previous second video frame, during detection of a frame type of the previous first video frame. This solves problems of high complexity and long delay due to calculating based on a plurality of previous video frames in existing video frame type detection, and impact of a video frame rate is fully considered, making a result of the detection more accurate.

Figure 9:
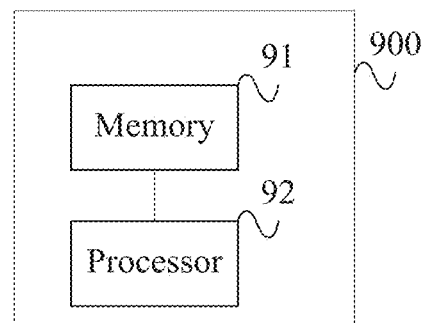
FIG. 9 is a schematic structural diagram of yet another frame type detection apparatus for a video stream according to an embodiment of the present invention.

FIG. 9 is a schematic structural diagram of yet another frame type detection apparatus for a video stream provided by an embodiment of the present invention. As shown in FIG. 9, a apparatus 900 includes:

a memory 91, configured to store an instruction; and a processor 92, coupled to the memory, and the processor 92 is configured to execute the instruction stored in the memory 91, where the processor 92 is configured to:

obtain a size of a current video frame, where the current video frame is located after the first video frame of the video stream;

obtain a change feature value of the current video frame according to the size of the current video frame and sizes of at least two previous video frames;

obtain an I-frame threshold of the current video frame according to a video frame rate and a location of the current video frame; and determine, according to the change feature value of the current video frame, a change feature value of a previous first video frame adjacent to the current video frame, the I-frame threshold of the current video frame, the size of the current video frame, and the sizes of the at least two previous video frames, whether the previous first video frame is an I frame.

Optionally, the processor 92 is specifically configured to:

if it is determined that a packet loss does not occur in the current video frame, obtain a payload of each RTP packet in the current video frame; and accumulate the payload of each RTP packet in the current video frame to obtain the size of the current video frame.

Optionally, the processor 92 is specifically configured to:

if it is determined that a packet loss occurs in the current video frame and the entire frame is not lost, obtain a payload of each received RTP packet in the current video frame, and accumulate the payload of each received RTP packets in the current video frame to obtain a total size of the received RTP packets in the current video frame;

estimate a payload of each lost RTP packet and the number of lost RTP packets in the current video frame according to a previous adjacent RTP packet of a lost RTP packet and a next adjacent RTP packet of the lost RTP packet in the current video frame among all received RTP packets, and obtain a total size of the lost RTP packets in the current video frame according to a payload of each lost RTP packet and the number of lost RTP packets in the current video frame; and add the total size of the received RTP packets and the total size of the lost RTP packets in the current video frame to obtain the size of the current video frame.

Furthermore, the processor 92 is specifically configured to:

obtain a payload of the previous adjacent RTP packet and a payload of the next adjacent RTP packet of the lost RTP packet in the current video frame among all the received RTP packets; and estimate the payload of each lost RTP packet according to the average value of the payload of the previous adjacent RTP packet and the payload of the next adjacent RTP packet.

Optionally, the processor 92 is further specifically configured to:

if it is determined according to timestamps of the previous adjacent RTP packet and the next adjacent RTP packet that both the previous adjacent RTP packet and the next adjacent RTP packet belong to the current video frame, or, if it is determined according to timestamps and marker bits of the previous adjacent RTP packet and the next adjacent RTP packet that the previous adjacent RTP packet belongs to the previous first video frame, the next adjacent RTP packet belongs to the current video frame, and the previous adjacent RTP packet is the last RTP packet in the previous first video frame, obtain the total number V_lostPackets of lost RTP packets between the previous adjacent RTP packet and the next adjacent RTP packet according to sequence numbers of the previous adjacent RTP packet and the next adjacent RTP packet; and determine that the number of lost RTP packets in the current video frame is V_lostPackets.

Optionally, the processor 92 is further specifically configured to:

if it is determined according to the timestamps and marker bits of the previous adjacent RTP packet and the next adjacent RTP packet that the previous adjacent RTP packet belongs to the current video frame, the next adjacent RTP packet belongs to a next video frame adjacent to the current video frame, and the previous adjacent RTP packet is not the last RTP packet in the current video frame, obtain the total number V_lostPackets of lost RTP packets between the previous adjacent RTP packet and the next adjacent RTP packet according to sequence numbers of the previous adjacent RTP packet and the next adjacent RTP packet; and determine that the number of lost RTP packets in the current video frame is int(V_lostPackets/2)+V_lostPackets%2.

Optionally, the processor 92 is further specifically configured to:

if it is determined according to timestamps and marker bits of the previous adjacent RTP packet and the next adjacent RTP packet that a video frame to which the previous adjacent RTP packet belongs and the current video frame are nonconsecutive, the next adjacent RTP packet belongs to the current video frame, and the previous adjacent RTP packet is the last RTP packet in the video frame to which the previous adjacent RTP packet belongs, obtain the number V_lostFrames of lost video frames between the previous adjacent RTP packet and the next adjacent RTP packet and the total number V_lostPackets of lost RTP packets according to a video frame rate, a clock rate of an RTP packet, and sequence numbers and timestamps of the previous adjacent RTP packet and the next adjacent RTP packet; and determine that the number of lost RTP packets in the current video frame is V_lostPackets%V_lostFrames.

Optionally, the processor 92 is further specifically configured to:

if it is determined according to timestamps and marker bits of the previous adjacent RTP packet and the next adjacent RTP packet that the previous adjacent RTP packet belongs to the current video frame, a video frame to which the next adjacent RTP packet belongs and the current video frame are nonconsecutive, and the previous adjacent RTP packet is not the last RTP packet in the current video frame, determine that the number of lost RTP packets in the current video frame is 1.

Optionally, the processor 92 is specifically configured to:

if it is determined that the entire current video frame is lost, estimate a payload of each lost RTP packet according to a previous adjacent RTP packet and a next adjacent RTP packet of the current video frame among all received RTP packets, obtain the number V_lostFrames of lost video frames between a video frame to which the previous adjacent RTP packet belongs and a video frame to which the next adjacent RTP packet belongs and the total number V_lostPackets of lost RTP packets according to a video frame rate, a clock rate of an RTP packet, and timestamps and sequence numbers of the previous adjacent RTP packet and the next adjacent RTP packet;

if it is determined according to the marker bit of the previous adjacent RTP packet that the previous adjacent RTP packet is the last RTP packet in the video frame to which the previous adjacent RTP packet belongs, determine that the number of RTP packets in the current video frame is int(V_lostPackets/V_lostFrames), and otherwise determine that the number of RTP packets in the current video frame is int((V_lostPackets−1)/V_lostFrames); and obtain the size of the current video frame according to the number of RTP packets in the current video frame and a payload of each lost RTP packet.

Furthermore, the processor 92 is further specifically configured to:

use an absolute value of an average value of difference values between the size of the current video frame and the sizes of the at least two previous video frames or an average value of absolute values of difference values between the size of the current frame and the sizes of the at least two previous video frames as the change feature value of the current video frame.

Furthermore, the processor 92 is further specifically configured to:

obtain the I-frame threshold of the current video frame according to the video frame rate and a distance between the current video frame and a previous closest I frame.

Optionally, the processor 92 is specifically configured to:

if a previous second video frame adjacent to the previous first video frame is the previous closest I frame, determine that the I-frame threshold of the current video frame is a product of a size of the previous closest I frame and a first constant, where a value range of the first constant is (0,1].

Optionally, the processor 92 is specifically configured to:

if the previous second video frame adjacent to the previous first video frame is not the previous closest I frame, determine whether the distance between the current video frame and the previous closest I frame is greater than the video frame rate, if greater than, determine the product of an I-frame threshold of the previous first video frame and a first scale factor as the I-frame threshold of the current video frame, and if not greater than, determine the product of the I-frame threshold of the previous first video frame and a second scale factor as the I-frame threshold of the current video frame; where a value range of the first scale factor and the second scale factor is both (0,1], and the first scale factor is greater than the second scale factor.

Furthermore, the processor 92 is further specifically configured to:

if a ratio of the size of the previous first video frame to the size of the previous second video frame or a ratio of the size of the previous first video frame to the size of the current video frame is greater than a second constant, the change feature value of the current video frame is greater than the I-frame threshold of the current video frame, and the change feature value of the previous first video frame is greater than the I-frame threshold of the current video frame, determine that the previous first video frame is an I frame, and otherwise determine that the previous first video frame is not an I frame; or, if a ratio of the size of the previous first video frame to the average value of sizes of at least two previous video frames before the previous first video frame or a ratio of the size of the previous first video frame to the size of the current video frame is greater than a second constant, the change feature value of the current video frame is greater than the I-frame threshold of the current video frame, and the change feature value of the previous first video frame is greater than the I-frame threshold of the current video frame, determine that the previous first video frame is an I frame, and otherwise determine that the previous first video frame is not an I frame.

Furthermore, the processor 92 is further specifically configured to:

if the current video frame is the second video frame of the video stream, determine that the previous first video frame is an I frame.

Optionally, the second constant is determined according to a code rate, the video frame rate, and the location of the current video frame.

Furthermore, the processor 92 is further configured to:

after it is determined that the previous first video frame is an I-frame, calculate an average size of each I frame.

Furthermore, if the current video frame is the last video frame in the video stream, the processor 92 is further specifically configured to:

if a ratio of the size of the current video frame to the average size of each I frame is greater than a third constant, determine that the current video frame is an I frame, and otherwise determine that the current video frame is not an I frame, where the third constant is greater than 0.

Optionally, the processor 92 is further configured to: obtain a size of the first video frame; determine that a change feature value of the first video frame is a product of the size of the first video frame and a fourth constant, where a value range of the fourth constant is (0,1]; and determine that an I-frame threshold of the first video frame equals the change feature value of the first video frame.

In this embodiment of the present invention, a change feature value of a current video frame is obtained according to sizes of the current video frame and at least two previous video frames, an I-frame threshold of the current video frame is obtained according to a video frame rate and a location of the current video frame, and it is determined according to the change feature value of the current video frame and a change feature value of a previous first video frame, the I-frame threshold of the current video frame, and the sizes of the current video frame and the at least two previous video frames whether the previous first video frame is an I frame. This provides a complete and effective frame type detection method, and impact of a video frame rate is fully considered, making a result of the detection more accurate.

Figure 10:
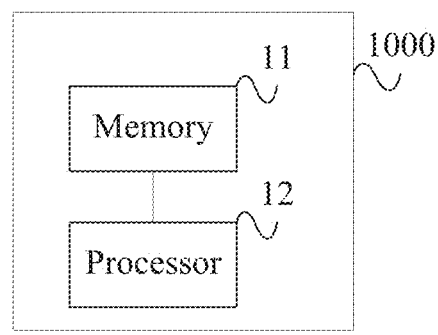
FIG. 10 is a schematic structural diagram of another frame size detection apparatus according to an embodiment of the present invention.

FIG. 10 is a schematic structural diagram of a frame size detection apparatus provided by an embodiment of the present invention another. As shown in FIG. 10, the apparatus 1000 includes:

a memory 11, configured to store an instruction; and a processor 12, coupled to the memory, and the processor 12 is configured to execute the instruction stored in the memory 11, where the processor 12 is configured to:

if it is determined that a packet loss occurs between two received RTP packets, obtain a payload of each received RTP packet, and estimate a payload of each lost RTP packet according to the payload of each received RTP packet;

obtain the total number V_lostPackets of lost RTP packets between the two RTP packets according to sequence numbers of the two RTP packets;

estimate the number of lost RTP packets in each frame with a packet loss according to the total number V_lostPackets of lost RTP packets, and timestamps and marker bits of the two RTP packets; and obtain a size of each frame with the packet loss according to the number of lost RTP packets in each frame with the packet loss and a payload of each lost RTP packet.

Furthermore, the processor 12 is specifically configured to:

estimate a payload of each lost RTP packet according to an average value of the payloads of the two RTP packets; or estimate a payload of each lost RTP packet according to an average value of payloads of a plurality of received RTP packets before a lost RTP packet.

Furthermore, the processor 12 is further specifically configured to:

if it is determined according to timestamps of the two RTP packets that the two RTP packets belong to a same frame, or, if it is determined according to the timestamps and marker bits of the two RTP packets that the two RTP packets separately belong to two consecutive frames and the former RTP packet is the last RTP packet in a frame to which the former RTP packet belongs, determine that the number of lost RTP packets in a frame to which the latter RTP packet belongs equals the total number V_lostPackets of lost RTP packets.

Optionally, the processor 12 is further specifically configured to:

if it is determined according to the timestamps and marker bits of the two RTP packets that the two RTP packets separately belong to two consecutive frames and the former RTP packet is not the last RTP packet in a frame to which the former RTP packet belongs, determine that the number of lost RTP packets in the frame to which the former RTP packet belongs is int(V_lostPackets/2)+V_lostPackets%2, and the number of lost RTP packets in the frame to which the latter RTP packet belongs is int(V_lostPackets/2).

Optionally, the processor 12 is further specifically configured to:

if it is determined according to the timestamps and marker bits of the two RTP packets that the two RTP packets belong to different frames, frames to which the two RTP packets belong are nonconsecutive, and the former RTP packet is the last RTP packet in a frame to which the former RTP packet belongs, determine the number V_lostFrames of lost entire frames between the frames to which the two RTP packets belong according to a video frame rate, a clock rate of an RTP packet, and the timestamps of the two RTP packets; and determine that the number of lost RTP packets in each lost entire frame is int(V_lostPackets/V_lostFrames), and the number of lost RTP packets in a frame to which the latter RTP packet belongs is V_lostPackets%V_lostFrames.

Optionally, the processor 12 is further specifically configured to:

if it is determined according to the timestamps and marker bits of the two RTP packets that the two RTP packets belong to different frames, frames to which the two RTP packets belong are nonconsecutive, and the former RTP packet is not the last RTP packet in a frame to which the former RTP packet belongs, determine the number V_lostFrames of lost entire frames between the frames to which the two RTP packets belong according to a video frame rate, a clock rate of an RTP packet, and the timestamps of the two RTP packets; and determine that the number of lost RTP packets in the frame to which the former RTP packet belongs is 1, the number of lost RTP packets in each lost entire frame is int((V_lostPackets−1)/V_lostFrames), and the number of lost RTP packets in a frame to which the latter RTP packet belongs is (V_lostPackets−1)%V_lostFrames.

For a specific implementation of this embodiment, refer to the frame size detection method provided by the foregoing embodiment of the present invention. In this embodiment of the present invention, if it is determined that a packet loss occurs between two received RTP packets, a payload of each lost RTP packet is estimated according to a payload of each received RTP packet, the total number of lost RTP packets between the two RTP packets is obtained according to sequence numbers of the two RTP packets, and then the number of lost RTP packets in each frame with a packet loss is estimated according to the total number V_lostPackets of lost RTP packets, and timestamps and marker bits of the two RTP packets, so that a size of each frame with the packet loss is obtained according to the number of lost RTP packets in each frame with the packet loss and a payload of each lost RTP packet. This provides an effective solution of detecting a size of a frame with a packet loss.

Finally, it should be noted that the foregoing embodiments are merely intended for describing the technical solutions of the present invention except limiting the present invention. Although the present invention is described in detail with reference to the foregoing embodiments, a person of ordinary skill in the art should understand that he may still make modifications to the technical solutions described in the foregoing embodiments or make equivalent replacements to some technical features thereof, without departing from the spirit and scope of the technical solutions of the embodiments of the present invention.

What is claimed is:

1. A frame type detection method for a video stream, comprising:
   obtaining a size of a current video frame, wherein the current video frame is located after the first video frame of the video stream;
   obtaining a change feature value of the current video frame according to the size of the current video frame and a size of a previous first video frame adjacent to the current video frame;
   obtaining an I-frame threshold of the current video frame according to a video frame rate and a location of the current video frame; and
   determining whether the previous first video frame is an I frame according to the change feature value of the current video frame, a change feature value of the previous first video frame, the I-frame threshold of the current video frame, the size of the current video frame, the size of the previous first video frame, and a size of a previous second video frame adjacent to the previous first video frame.

2. The method according to claim 1, wherein the obtaining a size of a current video frame specifically comprises:
   when it is determined that a packet loss does not occur in the current video frame, obtaining a payload of each Real-time Transport Protocol RTP packet in the current video frame; and
   accumulating the payload of each RTP packet in the current video frame to obtain the size of the current video frame.

3. The method according to claim 1, wherein the obtaining a size of a current video frame specifically comprises:
   when it is determined that a packet loss occurs in the current video frame and the entire frame is not lost, obtaining a payload of each received RTP packet in the current video frame, and accumulating the payload of each received RTP packet in the current video frame to obtain a total size of the received RTP packets in the current video frame;
   estimating a payload of each lost RTP packet and the number of lost RTP packets in the current video frame according to a previous adjacent RTP packet of a lost RTP packet and a next adjacent RTP packet of the lost RTP packet in the current video frame among all the received RTP packets, and obtaining a total size of the lost RTP packets in the current video frame according to the payload of each lost RTP packet and the number of lost RTP packets in the current video frame; and
   adding the total size of the received RTP packets in the current video frame and the total size of the lost RTP packets in the current video frame to obtain the size of the current video frame.

4. The method according to claim 3, wherein the estimating a payload of each lost RTP packet according to a previous adjacent RTP packet and a next adjacent RTP packet of a lost RTP packet in the current video frame among all received RTP packets specifically comprises:
   obtaining a payload of the previous adjacent RTP packet and a payload of the next adjacent RTP packet; and
   estimating the payload of each lost RTP packet according to the average value of the payload of the previous adjacent RTP packet and the payload of the next adjacent RTP packet.

5. The method according to claim 3, wherein the estimating the number of lost RTP packets in the current video frame according to a previous adjacent RTP packet of a lost RTP packet and a next adjacent RTP packet of the lost RTP packet in the current video frame among all received RTP packets specifically comprises:
   when it is determined according to timestamps of the previous adjacent RTP packet and the next adjacent RTP packet that both the previous adjacent RTP packet and the next adjacent RTP packet belong to the current video frame, or,
   if it is determined according to a marker bit of the previous adjacent RTP packet, a timestamp of the previous adjacent RTP packet, and a timestamp of the next adjacent RTP packet that the previous adjacent RTP packet belongs to the previous first video frame, the next adjacent RTP packet belongs to the current video frame, and the previous adjacent RTP packet is the last RTP packet in the previous first video frame, obtaining the total number V_lostPackets of lost RTP packets between the previous adjacent RTP packet and the next adjacent RTP packet according to sequence numbers of the previous adjacent RTP packet and the next adjacent RTP packet; and
   determining that the number of lost RTP packets in the current video frame is V_lostPackets.

6. The method according to claim 3, wherein the estimating the number of lost RTP packets in the current video frame according to a previous adjacent RTP packet of a lost RTP packet and a next adjacent RTP packet of the lost RTP packet in the current video frame among all received RTP packets specifically comprises:
   if it is determined according to a marker bit of the previous adjacent RTP packet, a timestamp of the previous adjacent RTP packet, and a timestamp of the next adjacent RTP packet that the previous adjacent RTP packet belongs to the current video frame, the next adjacent RTP packet belongs to a next video frame adjacent to the current video frame, and the previous adjacent RTP packet is not the last RTP packet in the current video frame, obtaining the total number V_lostPackets of lost RTP packets between the previous adjacent RTP packet and the next adjacent RTP packet according to sequence numbers of the previous adjacent RTP packet and the next adjacent RTP packet; and
   determining that the number of lost RTP packets in the current video frame is int(V_lostPackets/2)+V_lostPackets%2.

7. The method according to claim 3, wherein the estimating the number of lost RTP packets in the current video frame according to a previous adjacent RTP packet of a lost RTP packet and a next adjacent RTP packet of the lost RTP packet in the current video frame among all received RTP packets specifically comprises:

if it is determined according to a marker bit of the previous adjacent RTP packet, a timestamp of the previous adjacent RTP packet, and a timestamp of the next adjacent RTP packet that a video frame to which the previous adjacent RTP packet belongs and the current video frame are nonconsecutive, the next adjacent RTP packet belongs to the current video frame, and the previous adjacent RTP packet is the last RTP packet in the video frame to which the previous adjacent RTP packet belongs, obtaining the number V_lostFrames of lost video frames between the previous adjacent RTP packet and the next adjacent RTP packet and the total number V_lostPackets of lost RTP packets according to the video frame rate, a clock rate of an RTP packet, and sequence numbers and timestamps of the previous adjacent RTP packet and the next adjacent RTP packet; and determining that the number of lost RTP packets in the current video frame is V_lostPackets%V_lostFrames.

8. The method according to claim 3, wherein the estimating the number of lost RTP packets in the current video frame according to a previous adjacent RTP packet of a lost RTP packet and a next adjacent RTP packet of the lost RTP packet in the current video frame among all received RTP packets specifically comprises:

if it is determined according to a marker bit of the previous adjacent RTP packet, a timestamp of the previous adjacent RTP packet, and a timestamp of the next adjacent RTP packet that the previous adjacent RTP packet belongs to the current video frame, a video frame to which the next adjacent RTP packet belongs and the current video frame are nonconsecutive, and the previous adjacent RTP packet is not the last RTP packet in the current video frame, determining that the number of lost RTP packets in the current video frame is 1.

9. The method according to claim 1, wherein the obtaining a size of a current video frame specifically comprises:

if it is determined that the entire current video frame is lost, estimating a payload of each lost RTP packet according to a previous adjacent RTP packet and a next adjacent RTP packet of the current video frame among all received RTP packets, obtaining the number V_lostFrames of lost video frames between a video frame to which the previous adjacent RTP packet belongs and a video frame to which the next adjacent RTP packet belongs and the total number V_lostPackets of lost RTP packets according to a video frame rate, a clock rate of an RTP packet, and timestamps and sequence numbers of the previous adjacent RTP packet and the next adjacent RTP packet;

if it is determined according to a marker bit of the previous adjacent RTP packet that the previous adjacent RTP packet is the last RTP packet in the video frame to which the previous adjacent RTP packet belongs, determining that the number of RTP packets in the current video frame is int(V_lostPackets/V_lostFrames), if it is determined the previous adjacent RTP packet is not the last RTP packet, determining that the number of RTP packets in the current video frame is int((V_lostPackets−1)/V_lostFrames); and obtaining the size of the current video frame according to the number of RTP packets in the current video frame and a payload of each lost RTP packet.

10. The method according to claim 1, wherein the obtaining a change feature value of the current video frame according to the size of the current video frame and a size of a previous first video frame adjacent to the current video frame specifically comprises:

using an absolute value of a difference value between the size of the current video frame and the size of the previous first video frame as the change feature value of the current video frame.

11. The method according to claim 1, wherein the obtaining an I-frame threshold of the current video frame according to a video frame rate and a location of the current video frame specifically comprises:

obtaining the I-frame threshold of the current video frame according to the video frame rate and a distance between the current video frame and a previous closest I frame.

12. The method according to claim 11, wherein the obtaining the I-frame threshold of the current video frame according to the video frame rate and a distance between the current video frame and a previous closest I frame specifically comprises:

if the previous second video frame is the previous closest I frame, determining that the I-frame threshold of the current video frame is a product of a size of the previous closest I frame and a first constant, wherein a value range of the first constant is (0,1].

13. The method according to claim 11, wherein the obtaining the I-frame threshold of the current video frame according to the video frame rate and a distance between the current video frame and a previous closest I frame specifically comprises:

if the previous second video frame is not the previous closest I frame, determining whether the distance between the current video frame and the previous closest I frame is greater than the video frame rate, if greater than, determining a product of an I-frame threshold of the previous first video frame and a first scale factor as the I-frame threshold of the current video frame, and if not greater than, determining the product of the I-frame threshold of the previous first video frame and a second scale factor as the I-frame threshold of the current video frame; wherein a value range of the first scale factor and the second scale factor is (0,1], and the first scale factor is greater than the second scale factor.

14. The method according to claim 1, wherein the determining whether the previous first video frame is an I frame according to the change feature value of the current video frame, a change feature value of the previous first video frame, the I-frame threshold of the current video frame, the size of the current video frame, the size of the previous first video frame, and a size of a previous second video frame adjacent to the previous first video frame specifically comprises:

if a ratio of the size of the previous first video frame to the size of the previous second video frame or a ratio of the size of the previous first video frame to the size of the current video frame is greater than a second constant, the change feature value of the current video frame is greater than the I-frame threshold of the current video frame, and the change feature value of the previous first video frame is greater than the I-frame threshold of the current video frame, determining that the previous first video frame is an I frame, and otherwise determining that the previous first video frame is not an I frame.

15. The method according to claim 14, wherein the determining whether the previous first video frame is an I frame according to the change feature value of the current video frame, a change feature value of the previous first video frame, the I-frame threshold of the current video frame, the size of the current video frame, the size of the previous first video frame, and a size of a previous second video frame adjacent to the previous first video frame specifically further comprises:
- if the current video frame is the second video frame of the video stream, determining that the previous first video frame of the current video frame is an I frame.

16. The method according to claim 14, after the determining that the previous first video frame of the current video frame is an I frame, further comprising:
- calculating an average size of each I frame.

17. The method according to claim 16, wherein if the current video frame is the last video frame in the video stream, the method further comprises:
- if a ratio of the size of the current video frame to the average size of each I frame is greater than a third constant, determining that the current video frame is an I frame, and otherwise determining that the current video frame is not an I frame, wherein the third constant is greater than 0.

18. The method according to claim 1, before the obtaining a size of a current video frame, further comprising:
- obtaining a size of the first video frame;
- determining that a change feature value of the first video frame is a product of the size of the first video frame and a fourth constant, wherein a value range of the fourth constant is (0,1]; and
- determining that an I-frame threshold of the first video frame equals the change feature value of the first video frame.

19. A frame type detection apparatus for a video stream, comprising:
- a frame size obtaining module, configured to obtain a size of a current video frame, wherein the current video frame is located after the first video frame of the video stream;
- a feature extracting module, configured to obtain a change feature value of the current video frame according to the size of the current video frame and a size of a previous first video frame adjacent to the current video frame;
- a threshold obtaining module, configured to obtain an I-frame threshold of the current video frame according to a video frame rate and a location of the current video frame; and
- a type determining module, configured to determine whether the previous first video frame is an I frame according to the change feature value of the current video frame, a change feature value of the previous first video frame, the I-frame threshold of the current video frame, the size of the current video frame, the size of the previous first video frame, and a size of a previous second video frame adjacent to the previous first video frame.

20. The apparatus according to claim 19, wherein the frame size obtaining module is specifically configured to:
- if it is determined that a packet loss does not occur in the current video frame, obtain a payload of each Real-time Transport Protocol RTP packet in the current video frame; and
- accumulate the payload of each RTP packet in the current video frame to obtain the size of the current video frame.

21. The apparatus according to claim 19, wherein the frame size obtaining module specifically comprises:
- a received size obtaining unit, configured to: if it is determined that a packet loss occurs in the current video frame and the entire frame is not lost, obtain a payload of each received RTP packet in the current video frame, and accumulate the payload of each received RTP packet in the current video frame to obtain a total size of the received RTP packets in the current video frame;
- a lost size obtaining unit, configured to estimate a payload of each lost RTP packet and the number of lost RTP packets in the current video frame according to a previous adjacent RTP packet of a lost RTP packet and a next adjacent RTP packet of the lost RTP packet in the current video frame among all received RTP packets, and obtain a total size of the lost RTP packets in the current video frame according to a payload of each lost RTP packet and the number of lost RTP packets in the current video frame; and
- a frame size obtaining unit, configured to add the total size of the received RTP packets and the total size of the lost RTP packets in the current video frame to obtain the size of the current video frame.

22. The apparatus according to claim 21, wherein the lost size obtaining unit is specifically configured to:
- obtain a payload of the previous adjacent RTP packet and a payload of the next adjacent RTP packet; and
- estimate the payload of each lost RTP packet according to the average value of the payload of the previous adjacent RTP packet and the payload of the next adjacent RTP packet.

23. The apparatus according to claim 21, wherein the lost size obtaining unit is specifically further configured to:
- if it is determined according to timestamps of the previous adjacent RTP packet and the next adjacent RTP packet that both the previous adjacent RTP packet and the next adjacent RTP packet belong to the current video frame, or,
- if it is determined according to a marker bit of the previous adjacent RTP packet, a timestamp of the previous adjacent RTP packet, and a timestamp of the next adjacent RTP packet that the previous adjacent RTP packet belongs to the previous first video frame, the next adjacent RTP packet belongs to the current video frame, and the previous adjacent RTP packet is the last RTP packet in the previous first video frame, obtain the total number V_lostPackets of lost RTP packets between the previous adjacent RTP packet and the next adjacent RTP packet according to sequence numbers of the previous adjacent RTP packet and the next adjacent RTP packet; and
- determine that the number of lost RTP packets in the current video frame is V_lostPackets.

24. The apparatus according to claim 21, wherein the lost size obtaining unit is specifically further configured to:
- if it is determined according to a marker bit of the previous adjacent RTP packet, a timestamp of the previous adjacent RTP packet, and a timestamp of the next adjacent RTP packet that the previous adjacent RTP packet belongs to the current video frame, the next adjacent RTP packet belongs to a next video frame adjacent to the current video frame, and the previous adjacent RTP packet is not the last RTP packet in the current video frame, obtain the total number V_lostPackets of lost RTP packets between the previous adjacent RTP packet and the next adjacent RTP packet according to sequence numbers of the previous adjacent RTP packet and the next adjacent RTP packet; and determine that the number of lost RTP packets in the current video frame is int(V_lostPackets/2)+V_lostPackets%2.

25. The apparatus according to claim 21, wherein the lost size obtaining unit is specifically further configured to:
if it is determined according to a marker bit of the previous adjacent RTP packet, a timestamp of the previous adjacent RTP packet, and a timestamp of the next adjacent RTP packet that a video frame to which the previous adjacent RTP packet belongs and the current video frame are nonconsecutive, the next adjacent RTP packet belongs to the current video frame, and the previous adjacent RTP packet is the last RTP packet in the video frame to which the previous adjacent RTP packet belongs, obtain the number V_lostFrames of lost video frames between the previous adjacent RTP packet and the next adjacent RTP packet and the total number V_lostPackets of lost RTP packets according to a video frame rate, a clock rate of an RTP packet, and sequence numbers and timestamps of the previous adjacent RTP packet and the next adjacent RTP packet; and
determine that the number of lost RTP packets in the current video frame is V_lostPackets%V_lostFrames.

26. The apparatus according to claim 21, wherein the lost size obtaining unit is specifically further configured to:
if it is determined according to a marker bit of the previous adjacent RTP packet, a timestamp of the previous adjacent RTP packet, and a timestamp of the next adjacent RTP packet that the previous adjacent RTP packet belongs to the current video frame, a video frame to which the next adjacent RTP packet belongs and the current video frame are nonconsecutive, and the previous adjacent RTP packet is not the last RTP packet in the current video frame, determine that the number of lost RTP packets in the current video frame is 1.

27. The apparatus according to claim 19, wherein the frame size obtaining module is specifically configured to:
if it is determined that the entire current video frame is lost, estimate a payload of each lost RTP packet according to a previous adjacent RTP packet and a next adjacent RTP packet of the current video frame among all received RTP packets, obtain the number V_lostFrames of lost video frames between a video frame to which the previous adjacent RTP packet belongs and a video frame to which the next adjacent RTP packet belongs and the total number V_lostPackets of lost RTP packets according to a video frame rate, a clock rate of an RTP packet, and timestamps and sequence numbers of the previous adjacent RTP packet and the next adjacent RTP packet;
if it is determined according to a marker bit of the previous adjacent RTP packet that the previous adjacent RTP packet is the last RTP packet in the video frame to which the previous adjacent RTP packet belongs, determine that the number of RTP packets in the current video frame is int(V_lostPackets/V_lostFrames), and otherwise determine that the number of RTP packets in the current video frame is int((V_lostPackets−1)/V_lostFrames); and obtain the size of the current video frame according to the number of RTP packets in the current video frame and a payload of each lost RTP packet.

28. The apparatus according to claim 19, wherein the feature extracting module is specifically configured to:
use an absolute value of a difference value between the size of the current video frame and the size of the previous first video frame as the change feature value of the current video frame.

29. The apparatus according to claim 19, wherein the threshold obtaining module is specifically configured to:
obtain the I-frame threshold of the current video frame according to the video frame rate and a distance between the current video frame and a previous closest I frame.

30. The apparatus according to claim 29, wherein the threshold obtaining module is specifically configured to:
if the previous second video frame is the previous closest I frame, determine that the I-frame threshold of the current video frame is a product of a size of the previous closest I-frame and a first constant, wherein a value range of the first constant is (0,1].

31. The apparatus according to claim 29, wherein the threshold obtaining module is specifically configured to:
if the previous second video frame is not the previous closest I frame, determine whether the distance between the current video frame and the previous closest I frame is greater than the video frame rate, if greater than, determine a product of an I-frame threshold of the previous first video frame and a first scale factor as the I-frame threshold of the current video frame, and if not greater than, determine the product of the I-frame threshold of the previous first video frame and a second scale factor as the I-frame threshold of the current video frame; wherein a value range of the first scale factor and the second scale factor is both (0,1], and the first scale factor is greater than the second scale factor.

32. The apparatus according to claim 19, wherein the type determining module is specifically configured to:
if a ratio of the size of the previous first video frame to the size of the previous second video frame or a ratio of the size of the previous first video frame to the size of the current video frame is greater than a second constant, the change feature value of the current video frame is greater than the I-frame threshold of the current video frame, and the change feature value of the previous first video frame is greater than the I-frame threshold of the current video frame, determine that the previous first video frame is an I frame, and otherwise determine that the previous first video frame is not an I frame.

33. The apparatus according to claim 32, wherein the type determining module is specifically configured to:
if the current video frame is the second video frame of the video stream, determine that the previous first video frame is an I frame.

34. The apparatus according to claim 32, further comprising:
an average value calculating module, configured to: after the type determining module determines that the previous first video frame is an I frame, calculate an average size of each I frame.

35. The apparatus according to claim 34, wherein if the current video frame is the last video frame in the video stream, the type determining module is further configured to:

if a ratio of the size of the current video frame to the average size of each I frame is greater than a third constant, determine that the current video frame is an I frame, and otherwise determine that the current video frame is not an I frame, wherein the third constant is greater than 0.

36. The apparatus according to claim 19, wherein the frame size obtaining module is further configured to: obtain a size of the first video frame;
the feature extracting module is further configured to: determine that a change feature value of the first video frame is a product of the size of the first video frame and a fourth constant, wherein a value range of the fourth constant is (0,1]; and
the threshold obtaining module is further configured to determine that an I-frame threshold of the first video frame equals the change feature value of the first video frame.

* * * * *